(12) United States Patent  (10) Patent No.: US 8,051,733 B2
Mizuno et al.  (45) Date of Patent: Nov. 8, 2011

(54) TRANSMISSION FOR VEHICLE

(75) Inventors: Kinya Mizuno, Saitama (JP); Kazuhiko Sakaguchi, Saitama (JP); Eiji Kittaka, Saitama (JP); Seiji Hamaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1077 days.

(21) Appl. No.: 11/902,892

(22) Filed: Sep. 26, 2007

(65) Prior Publication Data

US 2008/0184844 A1 Aug. 7, 2008

(30) Foreign Application Priority Data

Sep. 29, 2006 (JP) ................................ 2006-270043

(51) Int. Cl.
*F16H 59/68* (2006.01)
(52) U.S. Cl. ........................................................ 74/335
(58) Field of Classification Search ................. None
See application file for complete search history.

(56) References Cited

U.S. PATENT DOCUMENTS

| 5,542,309 A | 8/1996 | Wenger et al. |
| 5,966,989 A | 10/1999 | Reed, Jr. et al. |
| 6,095,004 A | 8/2000 | Ota et al. |

FOREIGN PATENT DOCUMENTS

| DE | 103 34 628 A1 | 8/2004 |
| DE | 10 2004 058 475 A1 | 5/2006 |
| EP | 1 132 661 A1 | 9/2001 |
| JP | 9-317881 A | 12/1997 |
| JP | 10-184907 A | 7/1998 |
| JP | 2004-138131 A | 5/2004 |
| WO | WO-2006/056326 A1 | 6/2006 |

*Primary Examiner* — Edwin A Young
(74) *Attorney, Agent, or Firm* — Birch, Stewart, Kolasch & Birch, LLP

(57) ABSTRACT

A transmission for a vehicle in which changing a shift position is achieved by sliding a shifter. In sliding the shifter to change the established condition of gear trains respectively corresponding to a plurality of shift positions, the transmission of power from an engine to a main shaft is cut off. A feed mechanism for sliding the shifter is configured to reduce the sliding speed of the shifter in a neutral condition, or to cause the sliding operation of the shifter to have a single stopping action in the neutral condition during the sliding operation of the shifter in changing the established condition of the gear trains. The resulting configuration reduces the engagement noise when changing the shift position.

16 Claims, 16 Drawing Sheets

S1: DETERMINE THE START OF OPERATION OF SHIFTING MOTOR

S2: IS POWER SUPPLY VOLTAGE NORMAL?

S3: STOP THE OPERATION OF SHIFTING MOTOR

S4: UPSHIFTING?

S5: UPSHIFT MODE

S6: DOWNSHIFT MODE

FIG. 18

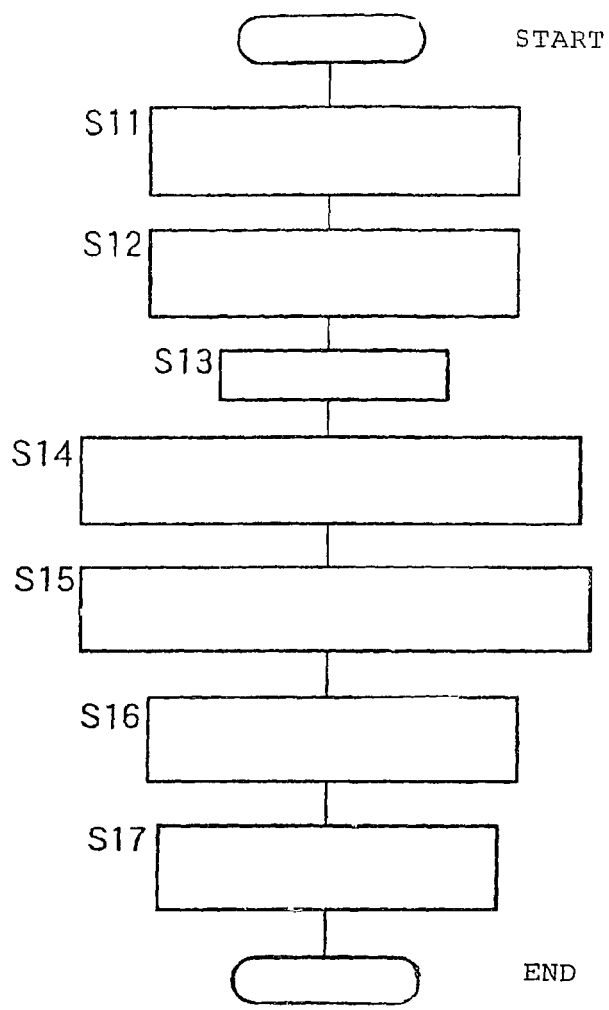

S11: ROTATE CHANGE SHAFT UP TO ROTATIONAL ANGLE α1

S12: ROTATE CHANGE SHAFT UP TO ROTATIONAL ANGLE α2

S13: MAINTAIN FOR PREDETERMINED TIME PERIOD

S14: ROTATE CHANGE SHAFT UP TO ROTATIONAL ANGLE α3 IN THE SAME DIRECTION

S15: DETERMINE THE ROTATIONAL POSITION OF SHIFT DRUM WITH DRUM ROTATIONAL ANGLE DETECTOR

S16: ROTATE CHANGE SHAFT SLOWLY IN THE REVERSE DIRECTION

S17: ROTATE CHANGE SHAFT AT NORMAL SPEED IN THE REVERSE DIRECTION

TRANSMISSION FOR VEHICLE

CROSS-REFERENCE TO RELATED APPLICATION

The present application claims priority under 35 U.S.C. §119 to Japanese Patent Application No. 2006-270043, filed Sep. 29, 2006, the entire contents of which are hereby incorporated by reference.

BACKGROUND OF THE INVENTION

1. Field of the Invention

The present invention relates to a transmission for a vehicle including a main shaft to which power from an engine is adapted to be transmitted, a counter shaft connected to a drive wheel, a plurality of gear trains respectively corresponding to a plurality of shift positions and provided between the main shaft and the counter shaft so as to be selectively established, a shifter relatively nonrotatably and slidably supported to the main shaft or the counter shaft to change the established condition of the gear trains, a shift fork for rotatably retaining the shifter, a shift drum having a lead groove on the outer circumference for engaging the shift fork, a shift drum center rotating with the shift drum, and a feed mechanism having a shifting motor for rotationally driving the shift drum center by a predetermined angle according to the operation of the shifting motor, wherein in sliding the shifter to change the established condition of the gear trains, the transmission of power from the engine to the main shaft is cut off.

2. Description of Background Art

Conventionally known in Japanese Patent Laid-open No. Hei 9-317881 is a transmission for a vehicle such that a plurality of positioning notches are formed on the outer circumference of a shift drum center rotating with a shift drum so as to be spaced at equal intervals in the circumferential direction of the shift drum center, wherein the shift drum center is intermittently rotated by a predetermined angle corresponding to the space between the adjacent positioning notches, thereby changing the established condition of a plurality of gear trains.

In the transmission disclosed in Japanese Patent Laid-open No. Hei 9-317881, the shift drum center is rotated at a fixed speed in changing the established condition of the gear trains. Accordingly, in sliding a shifter to change the established condition of the gear trains, a difference in speed between the shifter and a gear to be engaged with the shifter is relatively large, causing an increase in engagement noise. Particularly in such a vehicle that a shift position is automatically changed according to an upshift or downshift operation and that preliminary shifting is performed during running at any shift position, there is a possibility that a large engagement noise may be produced not in concert with the operation by an operator, so that the operator may feel discomfort in shifting.

It is accordingly an object of the present invention to provide a transmission for a vehicle which can reduce the engagement noise in changing the established condition of the gear trains by sliding the shifter.

SUMMARY AND OBJECTS OF THE INVENTION

In accordance with a first aspect of the present invention, there is provided a transmission for a vehicle including a main shaft to which power from an engine is adapted to be transmitted; a counter shaft connected to a drive wheel; a plurality of gear trains respectively corresponding to a plurality of shift positions and provided between the main shaft and the counter shaft so as to be selectively established; a shifter relatively nonrotatably and slidably supported to the main shaft or the counter shaft to change the established condition of the gear trains; and a feed mechanism for sliding the shifter in the axial direction of the main shaft or the counter shaft.

In sliding the shifter to change the established condition of the gear trains, the transmission of power from the engine to the main shaft is cut off; and the feed mechanism is configured to reduce the sliding speed of the shifter in the neutral condition, or to cause the sliding operation of the shifter to have a single stopping action in a neutral condition during the sliding operation of the shifter in changing the established condition of the gear trains.

In accordance with a second aspect of the present invention, the transmission for the vehicle further includes a shift fork for rotatably retaining the shifter; a shift drum having a lead groove on the outer circumference for engaging the shift fork; and a shift drum center rotating with the shift drum; wherein the feed mechanism has a shifting motor and rotationally drives the shift drum center by a predetermined angle according to the operation of the shifting motor; and the feed mechanism is configured to reduce the rotational speed of the shift drum center in the neutral condition, or to cause the rotation of the shift drum center to have a single stopping action in the neutral condition during the sliding operation of the shifter in changing the established condition of the gear trains.

In accordance with a third aspect of the present invention, there is provided a transmission for a vehicle including first and second main shafts to which power from an engine is adapted to be transmitted, the first and second main shafts being coaxial with each other; a counter shaft connected to a drive wheel; a plurality of gear trains respectively corresponding to a plurality of shift positions and provided between the first main shaft and the counter shaft and between the second main shaft and the counter shaft so as to be selectively established; a shifter relatively nonrotatably and slidably supported to the first main shaft or the counter shaft to change the established condition of the gear trains provided between the first main shaft and the counter shaft; and a feed mechanism for sliding the shifter in the axial direction of the first main shaft or the counter shaft.

In sliding the shifter to change the established condition of the gear trains provided between the first main shaft and the counter shaft, the transmission of power from the engine to the first main shaft is cut off in the condition where the power from the engine is transmitted to the second main shaft; and the feed mechanism is configured to reduce the sliding speed of the shifter or to once stop the sliding operation of the shifter in a neutral condition where the gear trains provided between the first main shaft and the counter shaft are not established during the sliding operation of the shifter in changing the established condition of the gear trains.

In accordance with a fourth aspect of the present invention, the transmission for the vehicle further includes a shift fork for rotatably retaining the shifter; a shift drum having a lead groove on the outer circumference for engaging the shift fork; and a shift drum center rotating with the shift drum; wherein the feed mechanism has a shifting motor and rotationally drives the shift drum center by a predetermined angle according to the operation of the shifting motor; and the feed mechanism is configured to reduce the rotational speed of the shift drum center or to once stop the rotation of the shift drum center in the neutral condition during the sliding operation of the shifter in changing the established condition of the gear trains provided between the first main shaft and the counter shaft.

In accordance with a fifth aspect of the present invention, there is provided a transmission for a vehicle including first and second main shafts to which power from an engine is adapted to be transmitted, the first and second main shafts being coaxial with each other; a counter shaft connected to a drive wheel; a plurality of gear trains respectively corresponding to a plurality of shift positions and provided between the first main shaft and the counter shaft and between the second main shaft and the counter shaft so as to be selectively established; a shifter relatively nonrotatably and slidably supported to the counter shaft so as to change the established condition of the gear trains provided between the second main shaft and the counter shaft; and a feed mechanism for sliding the shifter in the axial direction of the counter shaft.

In sliding the shifter to change the established condition of the gear trains provided between the second main shaft and the counter shaft, the transmission of power from the engine to the second main shaft is cut off in the condition where the power from the engine is transmitted to the first main shaft; and the feed mechanism is configured to reduce the sliding speed of the shifter or to once stop the sliding operation of the shifter in a neutral condition where the gear trains provided between the second main shaft and the counter shaft are not established during the sliding operation of the shifter in changing the established condition of the gear trains.

In accordance with a sixth aspect of the present invention, the transmission for the vehicle further includes a shift fork for rotatably retaining the shifter; a shift drum having a lead groove on the outer circumference for engaging the shift fork; and a shift drum center rotating with the shift drum; wherein the feed mechanism has a shifting motor and rotationally drives the shift drum center by a predetermined angle according to the operation of the shifting motor; and the feed mechanism is configured to reduce the rotational speed of the shift drum center or to once stop the rotation of the shift drum center in the neutral condition during the sliding operation of the shifter in changing the established condition of the gear trains provided between the second main shaft and the counter shaft.

In accordance with a seventh aspect of the present invention, a pair of idle gears constituting a part of two gear trains of the plurality of gear trains are rotatably supported to the main shaft or the counter shaft; and the lead groove formed on the outer circumference of the shift drum so as to engage the shift fork for rotatably retaining the shifter has a gear train establishing portion extending in the circumferential direction of the shift drum so as to bring the shifter into engagement with one of the idle gears, a gear train establishing portion offset from the gear train establishing portion in the axial direction of the shift drum and extending in the circumferential direction of the shift drum so as to bring the shifter into engagement with the other of the idle gears, a connecting portion for connecting both gear train establishing portions, and a neutral portion for holding the shifter at a position where the shifter is disengaged from both of the idle gears, the neutral portion being formed at the center of the connecting portion so as to extend in the circumferential direction of the shift drum.

In accordance with an eighth aspect of the present invention, the transmission for the vehicle further includes a drum stopper arm adapted to engage with the outer circumference of the shift drum center intermittently rotated by the feed mechanism, the drum stopper arm being biased toward the axis of rotation of the shift drum center to determine a rotational position of the shift drum center; wherein the outer circumference of the shift drum center is formed with a plurality of positioning notches spaced at equal intervals in the circumferential direction for selectively engaging the drum stopper arm to establish any selected one of the gear trains and a neutral notch adapted to engage the drum stopper arm to obtain the neutral condition, the neutral notch being formed between any adjacent ones of the plurality of positioning notches.

In accordance with a ninth aspect of the present invention, each of the positioning notches is V-shaped, and the neutral notch is arcuately shaped.

In accordance with a tenth aspect of the present invention, the shift drum center is intermittently rotated by the feed mechanism; the feed mechanism includes a drum shifter having the same axis of rotation as that of the shift drum center, at least a part of the drum shifter being located inside the shift drum center, a pair of pawls symmetrically mounted on the drum shifter so as to be raised or lowered in the radial direction of the drum shifter, a pair of springs for respectively biasing the pair of pawls in their raised directions, a plurality of engaging recesses formed on the inner circumference of the shift drum center and equally spaced in the circumferential direction of the shift drum center so as to be engageable with the pawls, a fixed guide plate for guiding the raised or lowered condition of the pawls according to the rotation of the drum shifter, and the shifting motor for producing a rotational force for the drum shifter; the guide plate has a large-diameter arcuate portion, a small-diameter arcuate portion, and a connecting portion for connecting the large-diameter arcuate portion and the small-diameter arcuate portion; and the connecting portion is formed so as to bring one of the pawls into engagement with one of the engaging recesses during the rotation of the drum shifter by a rotational amount required for changing of the established condition of the gear trains.

Effects of the present invention include the following:

According to the first and second aspects of the present invention, in sliding the shifter rotating with the main shaft or the counter shaft to change the established condition of the gear trains, the feed mechanism functions to reduce the sliding speed of the shifter or to once stop the sliding operation of the shifter in the neutral condition, thereby retarding the timing of engagement of the shifter to a gear of a selected one of the gear trains. Accordingly, a difference in speed between the shifter and the gear to be engaged with the shifter can be relatively reduced to thereby prevent an increase in engagement noise.

According to the third and fourth aspects of the present invention, in sliding the shifter rotating with the first main shaft to change the established condition of the gear trains in the condition where the transmission of power from the engine to the first main shaft is cut off and the power from the engine is transmitted to the second main shaft, the feed mechanism functions to reduce the sliding speed of the shifter or to once stop the sliding operation of the shifter in the neutral condition, thereby retarding the timing of engagement of the shifter to a gear of a selected one of the gear trains. In the condition where the idle gears engageable with the shifter are rotated by the establishment of the gear train provided between the second main shaft and the counter shaft, the rotation of the first main shaft is induced by the shaft bearing or the viscosity of a lubricating oil between the first and second main shafts. Accordingly, a difference in rotational speed between the shifter and the idle gear to be engaged with the shifter can be relatively reduced to thereby prevent an increase in engagement noise.

According to the fifth and sixth aspects of the present invention, in sliding the shifter rotating with the counter shaft to change the established condition of the gear trains in the condition where the transmission of power from the engine to the second main shaft is cut off and the power from the engine is transmitted to the first main shaft, the feed mechanism functions to reduce the sliding speed of the shifter or to once stop the sliding operation of the shifter in the neutral condition, thereby retarding the timing of engagement of the shifter to a gear of a selected one of the gear trains. In the condition where the counter shaft and the shifter are rotated by the establishment of the gear train provided between the first main shaft and the counter shaft, the rotation of the second main shaft is induced by the shaft bearing or the viscosity of a lubricating oil between the first and second main shafts. Accordingly, a difference in rotational speed between the gear of the selected gear train and the shifter can be relatively reduced to thereby prevent an increase in engagement noise.

According to the seventh aspect of the present invention, in sliding the shifter so as to disengage the shifter from one of the pair of idle gears provided on the opposite sides of the shifter and to engage the shifter to the other idle gear, the shift fork is guided by the neutral portion formed at the center of the connecting portion of the lead groove formed on the outer circumference of the shift drum and extending in the circumferential direction of the shift drum, thereby maintaining the shifter at the position where it is disengaged from both of the idle gears. Accordingly, as compared with the prior art structure such that the connecting portion is formed so as to straight connect the pair of gear train establishing portions, the timing of engagement of the shifter to the other idle gear can be retarded with respect to the rotation of the shift drum. Accordingly, a difference in speed between the shifter and the idle gear to be engaged with the shifter can be relatively reduced to thereby more effectively prevent an increase in engagement noise.

According to the eighth aspect of the present invention, in sliding the shifter rotating with the main shaft or the counter shaft to change the established condition of the gear trains, the drum stopper arm is brought into engagement with the neutral notch to thereby temporarily increase a rotational resistance acting on the shift drum center, thereby once reducing the rotational speed of the shift drum center. Accordingly, the timing of engagement of the shifter to the gear of the selected gear train can be retarded, so that a difference in speed between the shifter and the gear to be engaged with the shifter can be relatively reduced to thereby prevent an increase in engagement noise.

According to the ninth aspect of the present invention, the drum stopper arm can be quickly engaged to and disengaged from the positioning notches, and the disengagement of the drum stopper arm from the neutral notches can be made hard. Accordingly, the engaged condition of the drum stopper arm in the neutral notches can be maintained relatively long, so that the neutral condition can be maintained relatively long.

According to the tenth aspect of the present invention, in sliding the shifter to change the established condition of the gear trains, the intermittent feed mechanism functions to bring the pawl into engagement with the engaging recess, thereby once stopping the rotation of the shift drum. Accordingly, the timing of engagement of the shifter to the gear of the selected gear train can be retarded, so that a difference in speed between the shifter and the gear to be engaged with the shifter can be relatively reduced to thereby more effectively prevent an increase in engagement noise.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 18 is a flowchart showing a control procedure in an upshift mode;

DETAILED DESCRIPTION OF THE PREFERRED EMBODIMENTS

Figure 1:
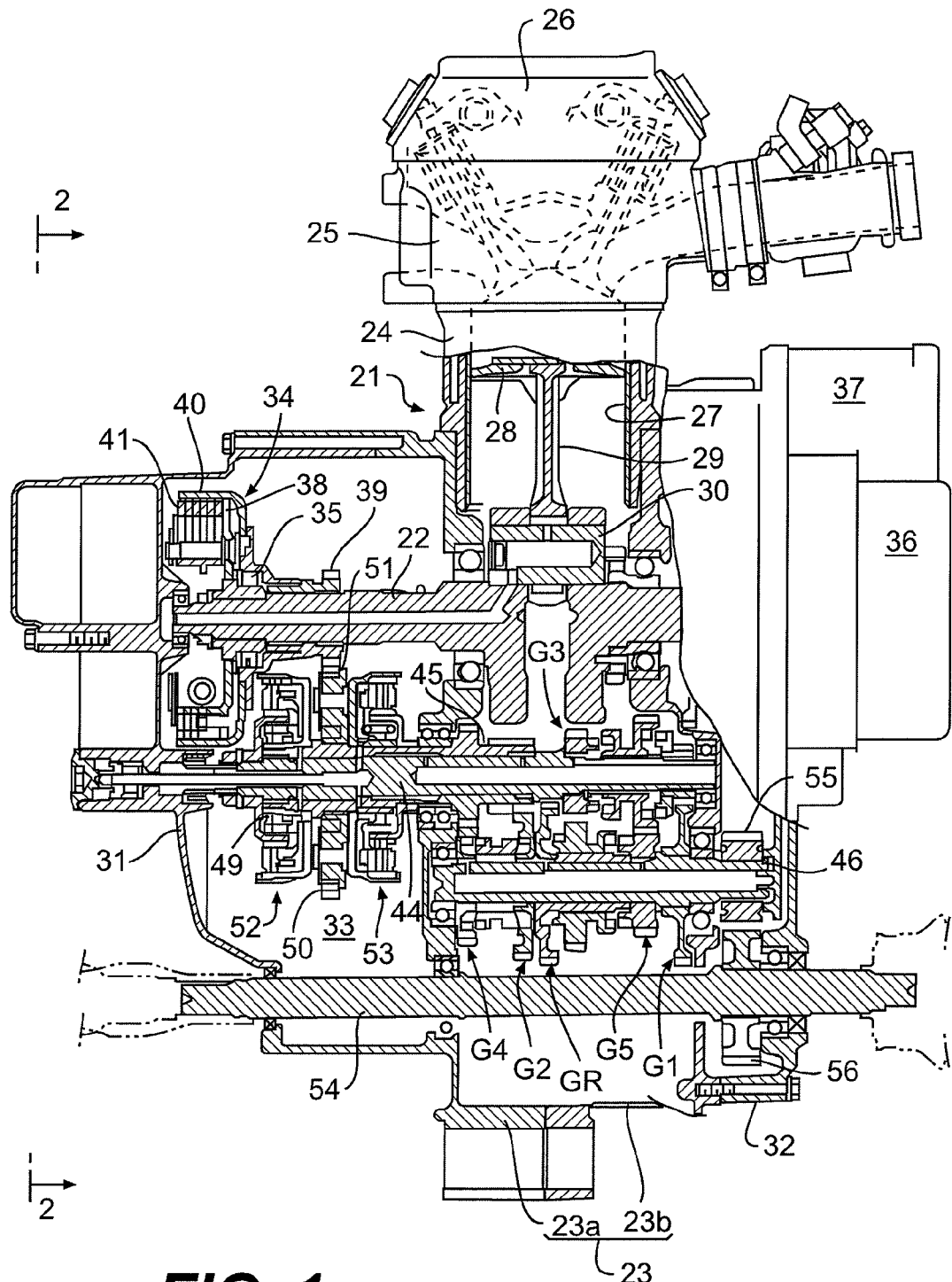
FIG. 1 is a longitudinal sectional view of an engine body, which corresponds to a cross section taken along the line 1-1 in FIG. 2.

FIGS. 1 to 19 show a first preferred embodiment of the present invention. Referring first to FIG. 1, an engine E having an engine body 2 is mounted on a vehicle for running in a rough terrain, for example. The engine body 2 includes a crankcase 23 for rotatably supporting a crankshaft 22 having an axis extending in the lateral direction of the vehicle (parallel to the plane of the sheet of FIG. 1), a cylinder block 24 joined to the upper end of the crankcase 23, a cylinder head 25 joined to the upper end of the cylinder block 24, and a head cover 26 joined to the upper end of the cylinder head 25. A piston 28 slidably fitted in a cylinder bore 27 of the cylinder block 24 is connected through a connecting rod 29 and a crankpin 30 to the crankshaft 22.

The crankcase 23 is composed of a pair of case halves 23a and 23b joined together along a plane perpendicular to the axis of the crankshaft 22. First and second crankcase covers 31 and 32 are fastened to the opposite side surfaces of the crankcase 23, and a clutch storing chamber 33 is formed between the crankcase 23 and the first crankcase cover 31.

One end of the crankshaft 22 projecting from the crankcase 23 is rotatably supported to the first crankcase cover 31, and a centrifugal clutch 34 stored in the clutch storing chamber 33 is mounted through a one-way clutch 35 to one end portion of the crankshaft 22 at a position near the first crankcase cover 31. A generator (not shown) located between the crankcase 23 and the second crankcase cover 32 is connected to the other end portion of the crankshaft 22 projecting from the crankcase 23, and a starting motor 36 mounted on the second crankcase cover 32 is also connected to the other end portion of the crankshaft 22. Further, a starting motor 37 for inputting a starting power to the crankshaft 22 is mounted on the second crankcase cover 32.

The centrifugal clutch 34 includes a drive plate 38 fixed to the crankshaft 22, a bowl-shaped clutch housing 40 for coaxially surrounding the drive plate 38 so as to be rotatable together with a drive gear 39 relatively rotatably mounted on the crankshaft 22, and a clutch weight 41 pivotably supported to the drive plate 38 so as to be frictionally engageable with the inner circumference of the clutch housing 40 according to the action of a centrifugal force generated during the rotation of the crankshaft 22. The one-way clutch 35 is provided between the clutch housing 40 and the drive plate 38 so as to allow the transmission of power from the drive gear 39 to the crankshaft 22.

Figure 2:
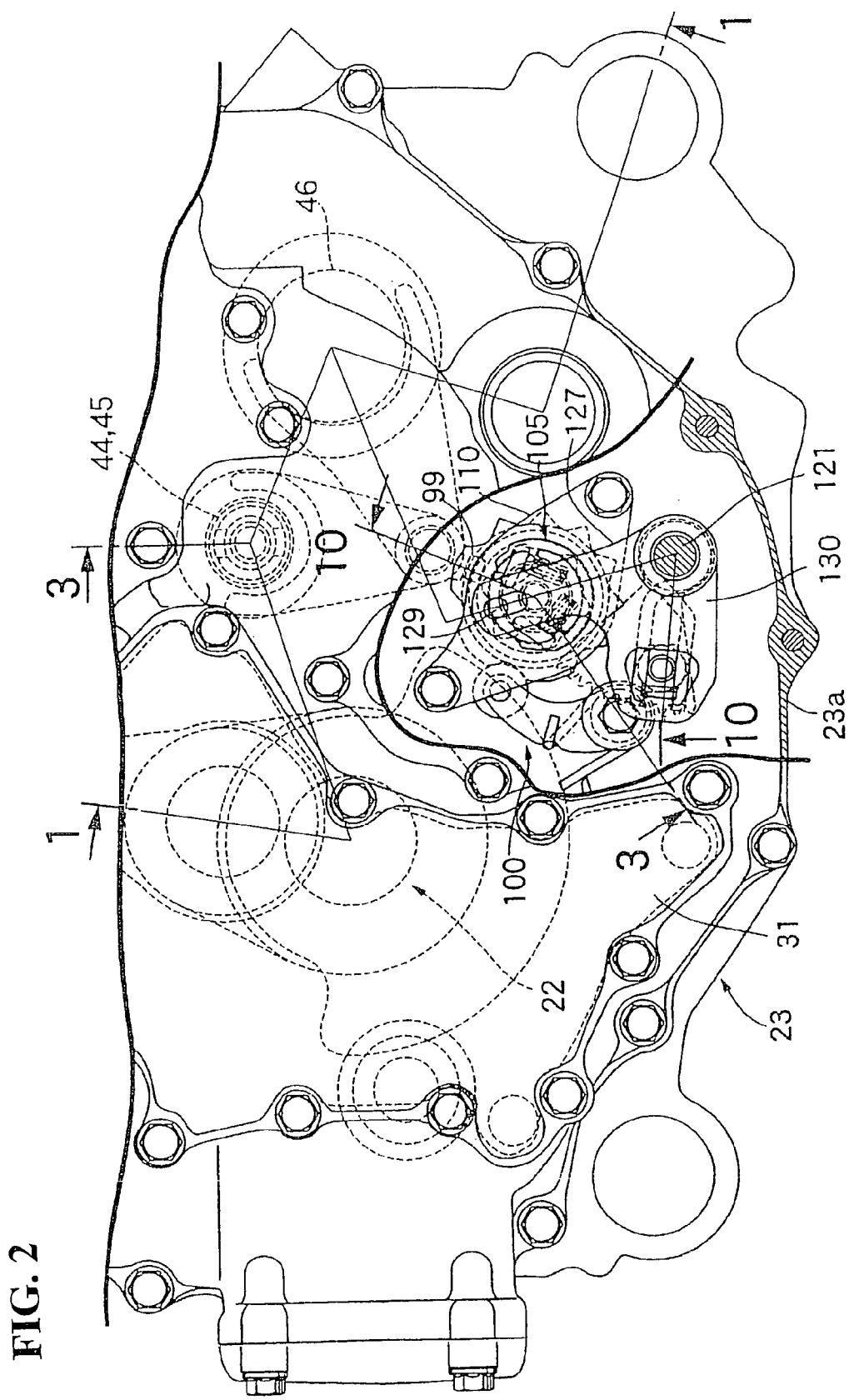
FIG. 2 is a partially cutaway side view taken in the direction shown by the arrow 2-2 in FIG. 1.
Figure 3:
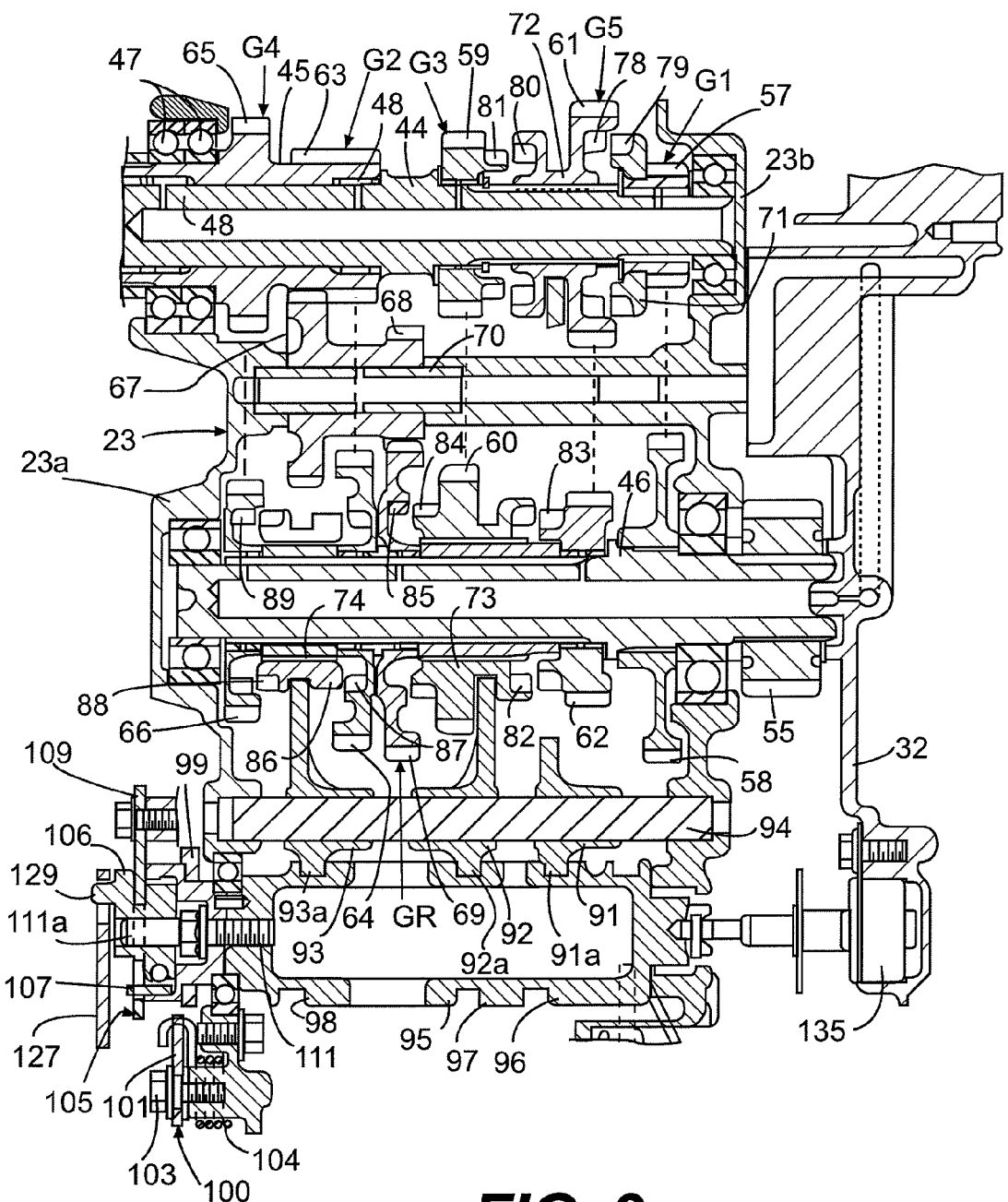
FIG. 3 is a cross section taken along the line 3-3 in FIG. 2.

Referring also to FIGS. 2 and 3, first and second main shafts 44 and 45 are supported to the crankcase 23 so as to be rotatable about a common axis parallel to the axis of the crankshaft 22. The first and second main shafts 44 and 45 are coaxially arranged so as to be rotatable relative to each other about the common axis. A counter shaft 46 parallel to the first and second main shafts 44 and 45 is also rotatably supported to the crankcase 23. A plurality of gear trains respectively corresponding to a plurality of shift positions are provided between the first main shaft 44 and the counter shaft 46 and between the second main shaft 45 and the counter shaft 46 so as to be selectively established. More specifically, a first speed gear train G1, a third speed gear train G3, and a fifth speed gear train G5 are provided between the first main shaft 44 and the counter shaft 46. A second speed gear train G2, a fourth speed gear train G4, and a reverse gear train GR are provided between the second main shaft 45 and the counter shaft 46.

The second main shaft 45 is rotatably supported through two ball bearings 47 to the crankcase 23, and the first main shaft 44 coaxially extends through the second main shaft 45 so as to be rotatable relative thereto. A plurality of needle bearings 48 are interposed between the first main shaft 44 and the second main shaft 45.

A cylindrical transmitting shaft 49 is relatively rotatably mounted on the first main shaft 44 in the clutch storing chamber 33. The power from the crankshaft 22 is transmitted through the drive gear 39 relatively rotatably mounted on the crankshaft 22, a driven gear 50 meshing with the drive gear 39, and a rubber damper 51 to the cylindrical transmitting shaft 49. A first hydraulic clutch 52 is provided between the cylindrical transmitting shaft 49 and the first main shaft 44, and a second hydraulic clutch 53 is provided between the cylindrical transmitting shaft 49 and the second main shaft 45.

When the first hydraulic clutch 52 is in an engaged condition, the power is transmitted from the crankshaft 22 to the first main shaft 44, and further transmitted from the first main shaft 44 through any selected one of the first speed, third speed, and fifth speed gear trains G1, G3, and G5 to the counter shaft 46. On the other hand, when the second hydraulic clutch 53 is in an engaged condition, the power is transmitted from the crankshaft 22 to the second main shaft 45, and further transmitted from the second main shaft 45 through any selected one of the second speed, fourth speed, and reverse gear trains G2, G4, and GR to the counter shaft 46.

As shown in FIG. 1, an output shaft 54 connected to drive wheels (not shown) and having an axis parallel to the axis of the crankshaft 22 is rotatably supported to the case half 23a of the crankcase 23 and the second crankcase cover 32. The opposite ends of the output shaft 54 project outward of the first and second crankcase covers 31 and 32 so as to be sealed liquid-tightly and rotatably. A drive gear 55 is fixed to an end portion of the counter shaft 46 projecting from the case half 23b of the crankcase 23, and a driven gear 56 meshing with the drive gear 55 is provided on the output shaft 54. Accordingly, the counter shaft 46 is connected through the drive gear 55, the driven gear 56, and the output shaft 54 to the drive wheels.

Referring to FIG. 3, the first speed gear train G1 is composed of a first speed drive idle gear 57 axially fixedly and relatively rotatably supported to the first main shaft 44 and a first speed driven gear 58 relatively nonrotatably mounted on the counter shaft 46 and meshing with the first speed drive idle gear 57. The third speed gear train G3 is composed of a third speed drive idle gear 59 axially fixedly and relatively rotatably supported to the first main shaft 44 and a third speed driven gear 60 relatively nonrotatably mounted on the counter shaft 46 and meshing with the third speed drive idle gear 59. The fifth speed gear train G5 is composed of a fifth speed drive gear 61 axially slidably arranged between the first and third drive idle gears 57 and 59 and relatively nonrotatably mounted on the first main shaft 44 and a fifth speed driven idle gear 62 axially fixedly and relatively rotatably supported to the counter shaft 46 and meshing with the fifth speed drive gear 61.

The second speed gear train G2 is composed of a second speed drive gear 63 formed integrally with the second main shaft 45 and a second speed driven idle gear 64 axially fixedly and relatively rotatably supported to the counter shaft 46 and meshing with the second speed drive gear 63. The fourth speed gear train G4 is composed of a fourth speed drive gear 65 formed integrally with the second main shaft 45 and a fourth speed driven idle gear 66 axially fixedly and relatively rotatably supported to the counter shaft 46 and meshing with the fourth speed drive gear 65. The reverse gear train GR is composed of the second speed drive gear 63, a first reverse idle gear 67 meshing with the second speed drive gear 63, a second reverse idle gear 68 formed integrally with the first reverse idle gear 67, and a reverse driven idle gear 69 axially fixedly and relatively rotatably supported to the counter shaft 46 and meshing with the second reverse idle gear 68. The first and second reverse idle gears 67 and 68 integral with each other are rotatably supported to a reverse idle shaft 70 supported at its opposite end portions to the crankcase 23 and having an axis parallel to the axes of the first main shaft 44, the second main shaft 45, and the counter shaft 46.

A ringlike engaged member 71 is fixed to an end portion of the first speed drive idle gear 57 on the third speed drive idle gear 59 side. A first shifter 72 is relatively nonrotatably and axially slidably supported to the first main shaft 44 between the engaged member 71 and the third speed drive idle gear 59. The fifth speed drive gear 61 is formed integrally with the first shifter 72. The first shifter 72 is slidable in the axial direction of the first main shaft 44 so as to switch among a position where the first shifter 72 is engaged with the engaged member 71 to establish the first speed gear train G1, a position where the first shifter 72 is engaged with the third speed drive idle gear 59 to establish the third speed gear train G3, and an intermediate position (neutral condition) where the first shifter 72 is engaged with neither the engaged member 71 (i.e., the first speed drive idle gear 57) nor the third speed drive idle gear 59.

A second shifter 73 is relatively nonrotatably and axially slidably supported to the counter shaft 46 between the fifth speed driven idle gear 62 and the reverse driven idle gear 69. The third speed driven gear 60 of the third speed gear train G3 is formed integrally with the second shifter 73. The second shifter 73 is slidable in the axial direction of the counter shaft 46 between a position where the second shifter 73 is engaged with the fifth speed driven idle gear 62 and a position where the second shifter 73 is engaged with the reverse driven idle gear 69 in the condition where the third speed driven gear 60 is kept in mesh with the third speed drive idle gear 59. Accordingly, when the second shifter 73 comes into engagement with the fifth speed driven idle gear 62 in the condition where the first shifter 72 is in the intermediate position, the fifth speed gear train G5 is established.

A third shifter 74 is relatively nonrotatably and axially slidably supported to the counter shaft 46 between the second speed driven idle gear 64 and the fourth speed driven idle gear 66. The third shifter 74 is slidable in the axial direction of the counter shaft 46 so as to switch among a position where the third shifter 74 is engaged with the second speed driven idle gear 64 to establish the second speed gear train G2, a position where the third shifter 74 is engaged with the fourth speed driven idle gear 66 to establish the fourth speed gear train G4, and an intermediate position (neutral condition) where the third shifter 74 is engaged with neither the second speed driven idle gear 64 nor the fourth speed driven idle gear 66. Accordingly, when the second shifter 73 comes into engagement with the reverse driven idle gear 69 in the condition where the first and third shifters 72 and 74 are in their respective intermediate positions, the reverse gear train GR is established.

Figure 4:
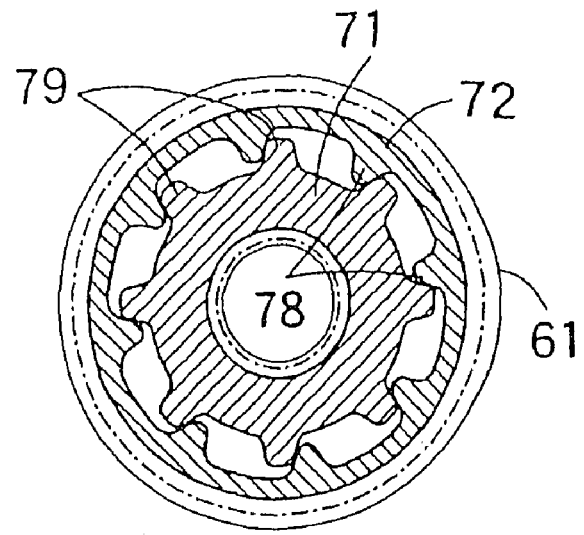
FIG. 4 is a transverse sectional view showing an engaged condition between a first shifter and an engaged member.
Figure 5:
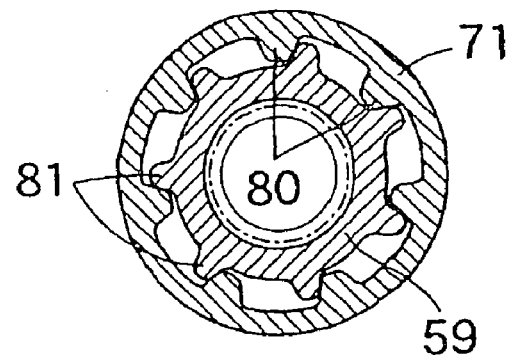
FIG. 5 is a transverse sectional view showing an engaged condition between the first shifter and a third speed drive idle gear.

One end portion of the first shifter 72 on the axial side opposed to the engaged member 71 fixed to the first speed drive idle gear 57 is formed with a plurality of first engaging projections 78 equally spaced in the circumferential direction of the first shifter 72 as shown in FIG. 4, and the engaged member 71 is formed with a plurality of first engaged projections 79 adapted to be respectively engaged with the first engaging projections 78. Similarly, the other end portion of the first shifter 72 on the axial side opposed to the third speed drive idle gear 59 is formed with a plurality of second engaging projections 80 equally spaced in the circumferential direction of as shown in FIG. 5, and the third speed drive idle gear 59 is formed with a plurality of second projections 81 adapted to be respectively engaged with the second engaging projections 80 of the first shifter 72.

Figure 6:
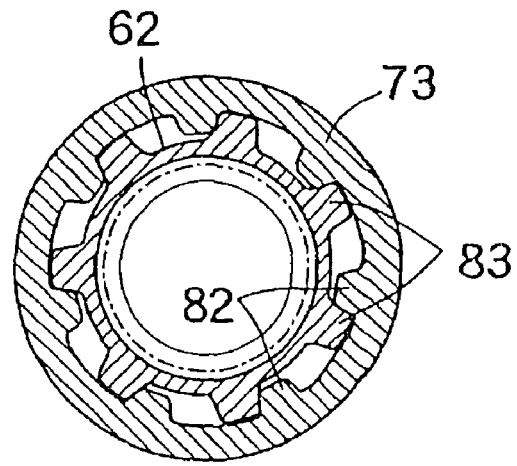
FIG. 6 is a transverse sectional view showing an engaged condition between a second shifter and a fifth speed driven idle gear.
Figure 7:
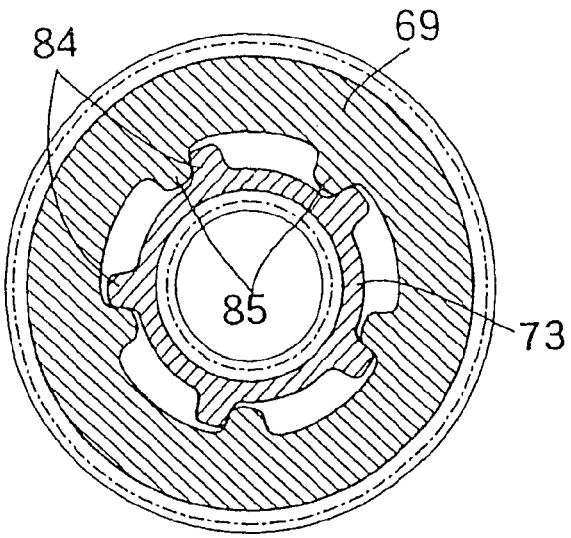
FIG. 7 is a transverse sectional view showing an engaged condition between the second shifter and a reverse driven idle gear.

One end portion of the second shifter 73 on the axial side opposed to the fifth speed driven idle gear 62 is formed with a plurality of third engaging projections 82 equally spaced in the circumferential direction as shown in FIG. 6, and the fifth speed driven idle gear 62 is formed with a plurality of third engaged projections 83 adapted to be respectively engaged with the third engaging projections 82 of the second shifter 73. Similarly, the other end portion of the second shifter 73 on the axial side opposed to the reverse driven idle gear 69 is formed with a plurality of fourth engaging projections 84 equally spaced in the circumferential direction of the second shifter 73 as shown in FIG. 7, and the reverse driven idle gear 69 is formed with a plurality of fourth engaged projections 85 adapted to be respectively engaged with the fourth engaging projections 84 of the second shifter 73.

Figure 8:
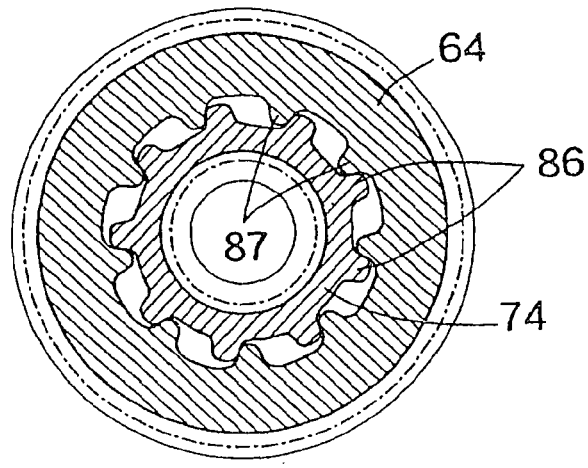
FIG. 8 is a transverse sectional view showing an engaged condition between a third shifter and a second speed driven idle gear.
Figure 9:
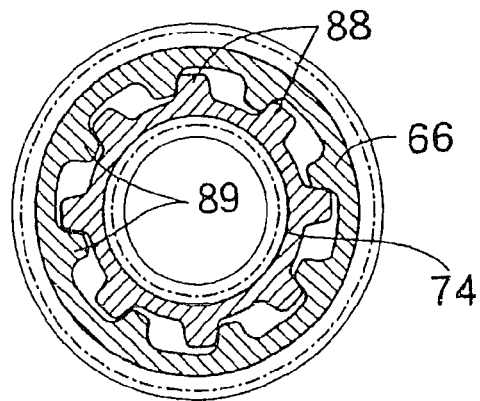
FIG. 9 is a transverse sectional view showing an engaged condition between the third shifter and a fourth speed driven idle gear.

One end portion of the third shifter 74 on the axial side opposed to the second speed driven idle gear 64 is formed with a plurality of fifth engaging projections 86 equally spaced in the circumferential direction of the third shifter 74 as shown in FIG. 8, and the second speed driven idle gear 64 is formed with a plurality of fifth engaged projections 87 adapted to be respectively engaged with the fifth engaging projections 86 of the third shifter 74. Similarly, the other end portion of the third shifter 74 on the axial side opposed to the fourth speed driven idle gear 66 is formed with a plurality of sixth engaging projections 88 equally spaced in the circumferential direction of the third shifter 74 as shown in FIG. 9, and the fourth speed driven idle gear 66 is formed with a plurality of sixth engaged projections 89 adapted to be respectively engaged with the sixth engaging projections 88 of the third shifter 74.

The first to sixth engaging projections 78, 80, 82, 84, 86, and 88 and the first to sixth engaged projections 79, 81, 83, 85, 87, and 89 are small in size and large in number, and have a shape similar to the shape of gear teeth in such a manner that the width of each projection is gradually reduced toward its radial end. By setting the size, number, and shape of the first to sixth engaging projections 78, 80, 82, 84, 86, and 88 and the first to sixth engaged projections 79, 81, 83, 85, 87, and 89 as mentioned above, it is possible to reduce engagement noise at the time of engagement between any mating ones of the first to sixth engaging projections 78, 80, 82, 84, 86, and 88 and the first to sixth engaged projections 79, 81, 83, 85, 87, and 89.

Figure 10:
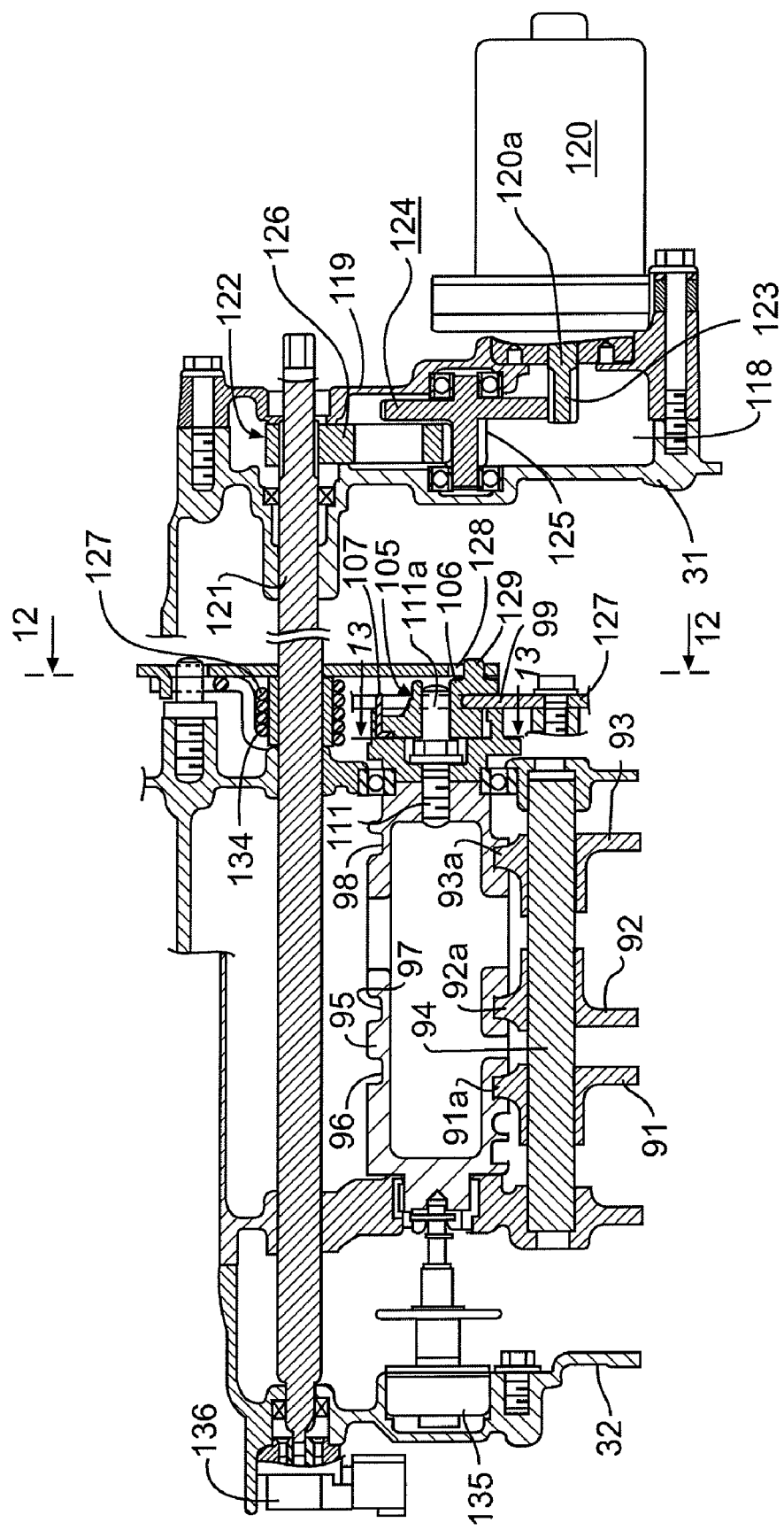
FIG. 10 is a cross section taken along the line 10-10 in FIG. 2.

Referring also to FIG. 10, the first, second and third shifters 72, 73, and 74 are rotatably retained to first, second, and third shift forks 91, 92, and 93, respectively. The shift forks 91 to 93 are axially slidably supported to a shift fork shaft 94 supported to the crankcase 23 and having an axis parallel to the axes of the first and second main shafts 44 and 45 and the counter shaft 46. A shift drum 95 having an axis parallel to the axes of the first and second main shafts 44 and 45 and the counter shaft 46 is rotatably supported to the crankcase 23. The first, second, and third shift forks 91, 92, and 93 have pins 91a, 92a, and 93a, respectively, and first, second, and third lead grooves 96, 97, and 98 are formed on the outer circumferential surface of the shift drum 95. The pins 91a, 92a, and 93a of the first, second, and third shift forks 91, 92, and 93 are engaged with the first, second, and third lead grooves 96, 97, and 98 of the shift drum 95, respectively. When the shift drum 95 is rotated, the first to third shift forks 91 to 93 are axially slid according to the patterns of the first to third lead grooves 96 to 98.

Figure 11:
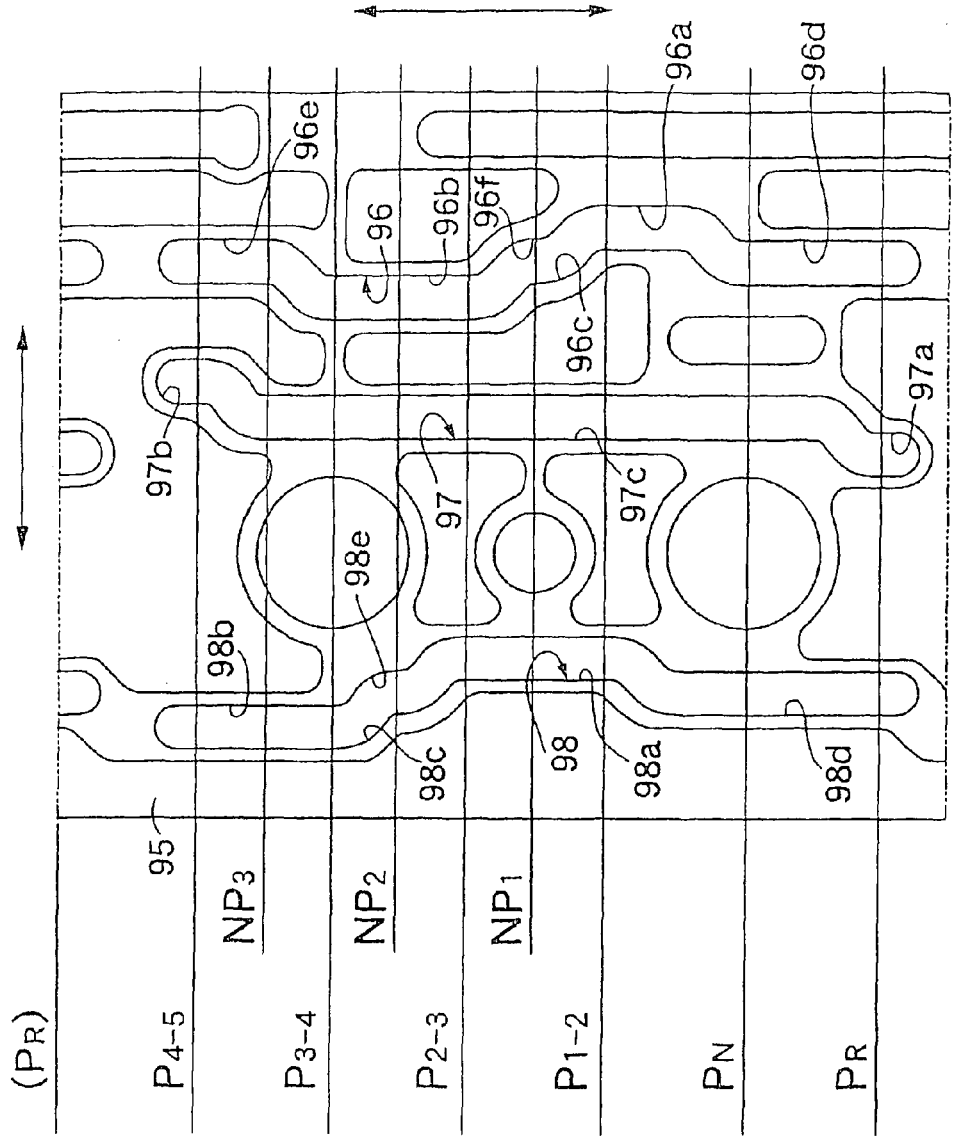
FIG. 11 is a development of the outer circumferential surface of a shift drum.

Referring to FIG. 11, the first lead groove 96 functions to guide the sliding operation of the first shift fork 91 retaining the first shifter 72. The first lead groove 96 has a first speed gear establishing portion 96a extending in the circumferential direction of the shift drum 95 so as to bring the first shifter 72 into engagement with the engaged member 71 fixed to the first speed drive idle gear 57, a third speed gear train establishing portion 96b offset from the first speed gear train establishing portion 96a in the axial direction of the shift drum 95 and extending in the circumferential direction of the shift drum 95 so as to bring the first shifter 72 into engagement with the third speed drive idle gear 59, a connecting portion 96c for connecting the first speed gear train establishing portion 96a and the third speed gear train establishing portion 96b, and a pair of intermediate position holding portions 96d and 96e for holding the intermediate position of the first shifter 72. Further, a neutral portion 96f for holding the first shifter 72 at a position where the first shifter 72 is disengaged from the first speed drive idle gear 57 and the third speed drive idle gear 59 is formed at the center of the connecting portion 96c so as to extend slightly in the circumferential direction of the shift drum 95.

The second lead groove 97 functions to guide the sliding operation of the second shift fork 92 retaining the second shifter 73. The second lead groove 97 has a reverse gear train establishing portion 97a extending in the circumferential direction of the shift drum 95 so as to bring the second shifter 73 into engagement with the reverse driven idle gear 69, a fifth speed gear train establishing portion 97b offset from the reverse gear train establishing portion 97a in the axial direction of the shift drum 95 and extending in the circumferential direction of the shift drum 95 so as to bring the second shifter 73 into engagement with the fifth speed driven idle gear 62, and an intermediate position holding portion 97c for holding the intermediate position of the second shifter 73.

The third lead groove 98 functions to guide the sliding operation of the third shift fork 93 retaining the third shifter 74. The third lead groove 98 has a second speed gear train establishing portion 98a extending in the circumferential direction of the shift drum 95 so as to bring the third shifter 74 into engagement with the second speed driven idle gear 64, a fourth speed gear train establishing portion 98b offset from the second speed gear train establishing portion 98a in the axial direction of the shift drum 95 and extending in the circumferential direction of the shift drum 95 so as to bring the third shifter 74 into engagement with the fourth speed driven idle gear 66, a connecting portion 98c for connecting the second speed gear train establishing portion 98a and the fourth speed gear train establishing portion 98b, and an intermediate position holding portion 98d for holding the intermediate position of the third shifter 74. Further, a neutral portion 98e for holding the third shifter 74 at a position where the third shifter 74 is disengaged from the second speed driven idle gear 64 and the fourth speed driven idle gear 66 is formed at the center of the connecting portion 98c so as to extend slightly in the circumferential direction of the shift drum 95.

There are set on the shift drum 95 a reverse position $P_R$, neutral position $P_N$, first and second speed position $P_{1-2}$, second and third speed position $P_{2-3}$, third and fourth speed position $P_{3-4}$, and fourth and fifth speed position $P_{4-5}$ spaced at 60° intervals in the circumferential direction.

At the reverse position $P_R$, the pins 91a and 93a of the first and third shift forks 91 and 93 are respectively engaged with the intermediate position holding portions 96d and 98d of the first and third lead grooves 96 and 98, and the pin 92a of the second shift fork 92 is engaged with the reverse gear train establishing portion 97a of the second lead groove 97, thereby establishing the reverse gear train GR. At the neutral position $P_N$, the pins 91a, 92a, and 93a of the first, second, and third shift forks 91, 92, and 93 are respectively engaged with the intermediate position holding portions 96d, 97c, and 98d of the first, second, and third lead grooves 96, 97, and 98, thereby establishing none of the gear trains G1 to G5 and GR. At the first and second speed position $P_{1-2}$, the pin 91a of the first shift fork 91 is engaged with the first speed gear train establishing portion 96a of the first lead groove 96, the pin 92a of the second shift fork 92 is engaged with the intermediate position holding portion 97c of the second lead groove 97, and the pin 93a of the third shift fork 93 is engaged with the second speed gear train establishing portion 98a of the third lead groove 98, thereby establishing both of the first and second speed gear trains G1 and G2. At the second and third speed position $P_{2-3}$, the pin 91a of the first shift fork 91 is engaged with the third speed gear train establishing portion 96b of the first lead groove 96, the pin 92a of the second shift fork 92 is engaged with the intermediate position holding portion 97c of the second lead groove 97, and the pin 93a of the third shift fork 93 is engaged with the second speed gear train establishing portion 98a of the third lead groove 98, thereby establishing both of the second and third speed gear trains G2 and G3. At the third and fourth speed position $P_{3-4}$, the pin 91a of the first shift fork 91 is engaged with the third speed gear train establishing portion 96b of the first lead groove 96, the pin 92a of the second shift fork 92 is engaged with the intermediate position holding portion 97c of the second lead groove 97, and the pin 93a of the third shift fork 93 is engaged with the fourth speed gear train establishing portion 98b of the third lead groove 98, thereby establishing both of the third and fourth speed gear trains G3 and G4. At the fourth and fifth speed position $P_{4-5}$, the pin 91a of the first shift fork 91 is engaged with the intermediate position holding portion 96e of the first lead groove 96, the pin 92a of the second shift fork 92 is engaged with the fifth speed gear train establishing portion 97b of the second lead groove 97, and the pin 93a of the third shift fork 93 is engaged with the fourth speed gear train establishing portion 98b of the third lead groove 98, thereby establishing both of the fourth and fifth speed gear trains G4 and G5.

Accordingly, a higher speed gear train can be preliminarily established before upshifting, and a lower speed gear train can be preliminarily established before downshifting.

A 1-3 neutral position $NP_1$ as a neutral position in switching between the established conditions of the first speed gear train G1 and the third speed gear train G3 provided between the first main shaft 44 and the counter shaft 46 is set at the center between the first and second speed position $P_{1-2}$ and the second and third speed position $P_{2-3}$ in the circumferential direction of the shift drum 95, and the neutral portion 96f of the first lead groove 96 is formed at the 1-3 neutral position $NP_1$. Similarly, a 2-4 neutral position $NP_2$ as a neutral position in switching between the established conditions of the second speed gear train G2 and the fourth speed gear train G4 provided between the second main shaft 45 and the counter shaft 46 is set at the center between the second and third speed position $P_{2-3}$ and the third and fourth speed position $P_{3-4}$ in the circumferential direction of the shift drum 95, and the neutral portion 98e of the third lead groove 98 is formed at the 2-4 neutral position $NP_2$. Further, a 3-5 neutral position $NP_3$ as a neutral position in switching between the established conditions of the third speed gear train G3 and the fifth speed gear train G5 provided between the first main shaft 44 and the counter shaft 46 is set at the center between the third and fourth speed position $P_{3-4}$ and the fourth and fifth speed position $P_{4-5}$ in the circumferential direction of the shift drum 95.

Figure 12:
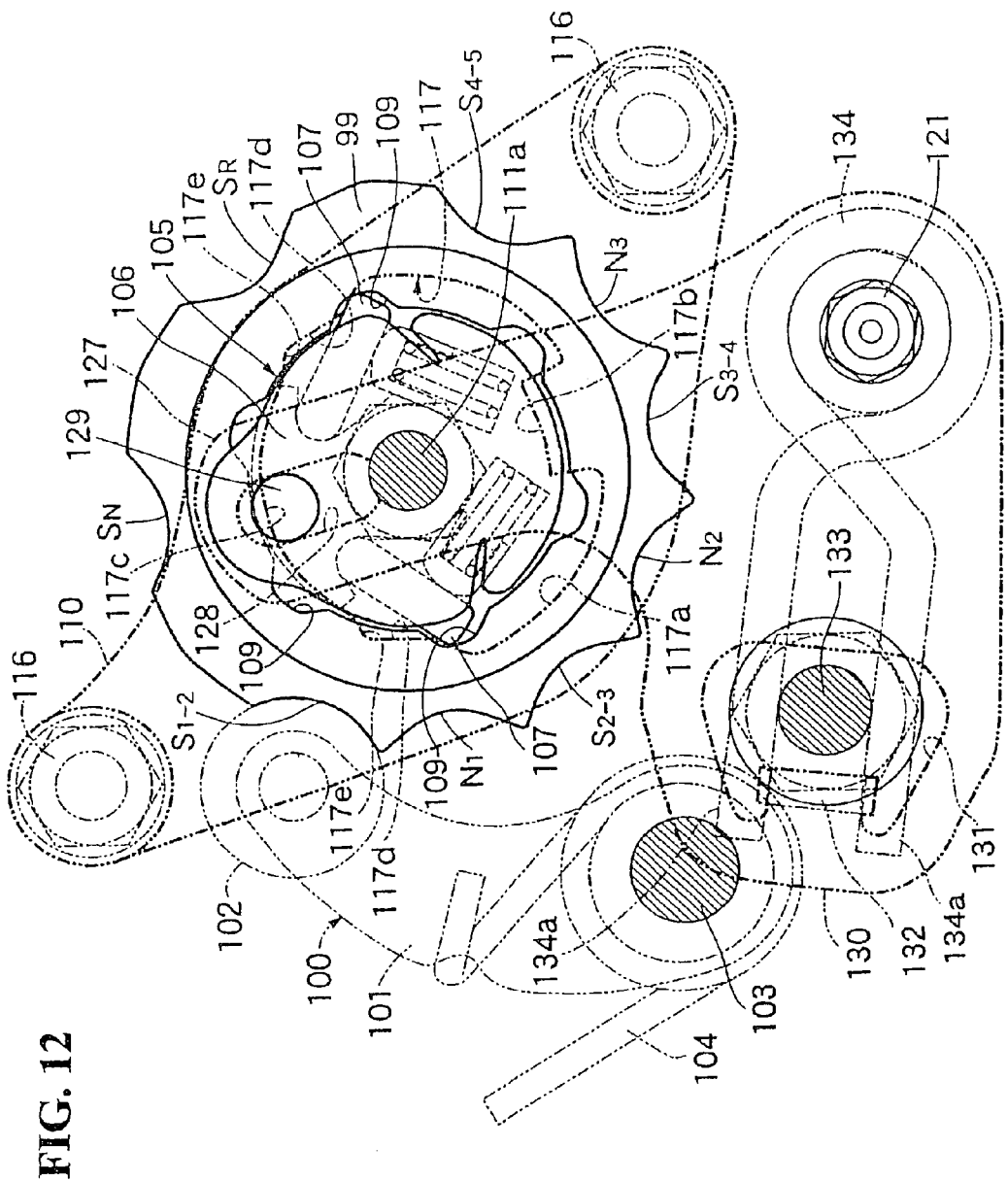
FIG. 12 is an enlarged cross section taken along the line 12-12 in FIG. 10 in a first speed running condition.
Figure 13:
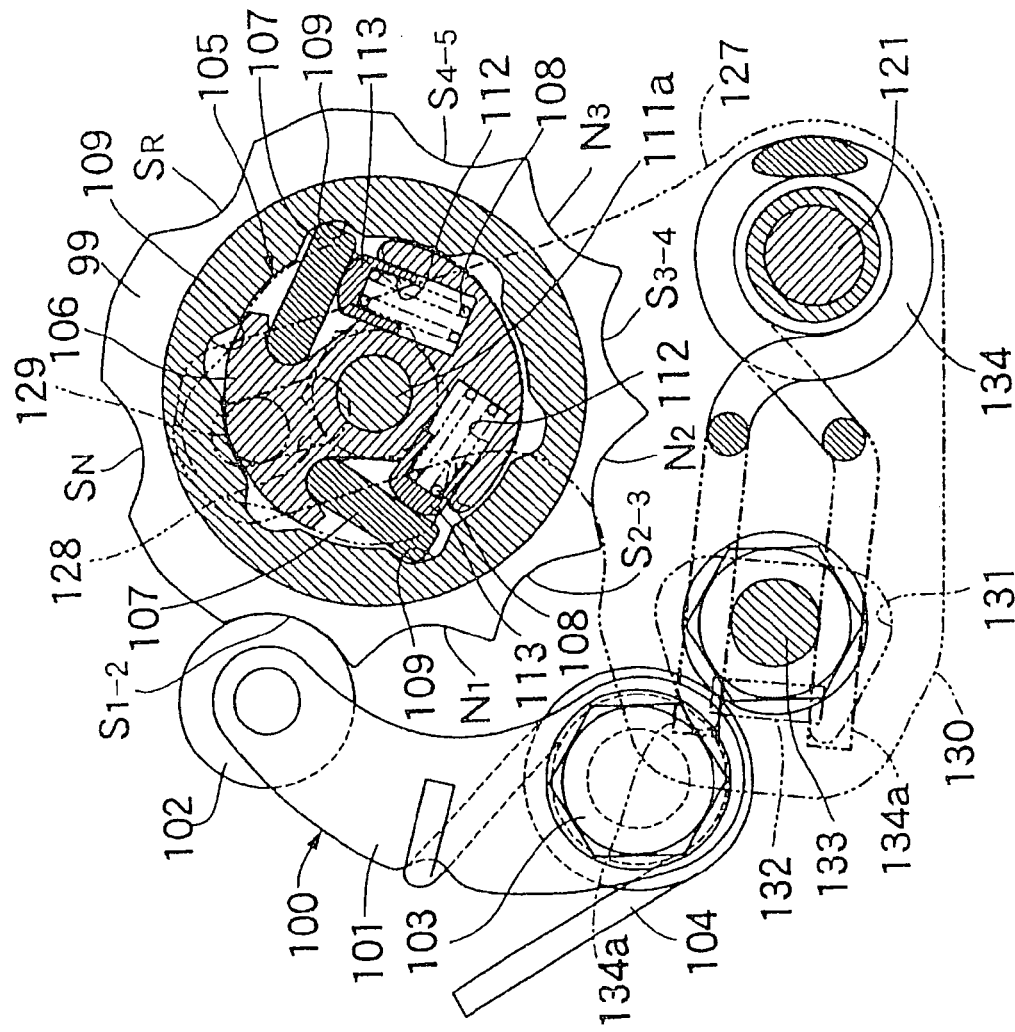
FIG. 13 is an enlarged cross section taken along the line 13-13 in FIG. 10 in the first speed running condition.

Referring also to FIGS. 12 and 13, a shift drum center 99 is coaxially fixed to one end of the shift drum 95 with a bolt 111 so as to be rotatable with the shift drum 95. There are formed on the outer circumference of the shift drum center 99 a reverse positioning notch $S_R$, neutral positioning notch $S_N$, first and second speed positioning notch $S_{1-2}$, second and third speed positioning notch $S_{2-3}$, third and fourth speed positioning notch $S_{3-4}$, and fourth and fifth speed positioning notch $S_{4-5}$ spaced at equal intervals in the circumferential direction of the shift drum center 99. These notches $S_R$, $S_N$, $S_{1-2}$, $S_{2-3}$, $S_{3-4}$, and $S_{4-5}$ respectively correspond to the reverse position $P_R$, the neutral position $P_N$, the first and second speed position $P_{1-2}$, the second and third speed position $P_{2-3}$, the third and fourth speed position $P_{3-4}$, and the fourth and fifth speed position $P_{4-5}$ set on the shift drum 95 to selectively establish the first to fifth speed gear trains G1 to G5 and the reverse gear train GR. In this preferred embodiment, the notches $S_R$, $S_N$, $S_{1-2}$, $S_{2-3}$, $S_{3-4}$, and $S_{4-5}$ are formed on the outer circumference of the shift drum center 99 so as to be spaced at 60° intervals.

Further, a neutral notch $N_1$ is formed on the outer circumference of the shift drum center 99 between the first and second speed positioning notch $S_{1-2}$ and the second and third speed positioning notch $S_{2-3}$. Similarly, a neutral notch $N_2$ is formed on the outer circumference of the shift drum center 99 between the second and third speed positioning notch $S_{2-3}$ and the third and fourth speed positioning notch $S_{3-4}$. Similarly, a neutral notch $N_3$ is formed on the outer circumference of the shift drum center 99 between the third and fourth speed positioning notch $S_{3-4}$ and the fourth and fifth speed positioning notch $S_{4-5}$. These neutral notches $N_1$, $N_2$, and $N_3$ respectively correspond to the 1-3 neutral position $NP_1$, the 2-4 neutral position $NP_2$, and the 3-5 neutral position $NP_3$.

A drum stopper arm 100 is selectively engaged with the notches $S_R$, $S_N$, $S_{1-2}$, $S_{2-3}$, $S_{3-4}$, $S_{4-5}$, $N_1$, $N_2$, and $N_3$ of the shift drum center 99. The drum stopper arm 100 is composed of an arm 101 pivotably supported at its base end through a support shaft 103 having an axis parallel to the axis of the shift drum 95 and the shift drum center 99 to the case half 23a of the crankcase 23 and a roller 102 supported to the front end of the arm 101 so as to be engaged with one of the notches $S_R$, $S_N$, $S_{1-2}$, $S_{2-3}$, $S_{3-4}$, $S_{4-5}$, $N_1$, $N_2$, and $N_3$. Each of these notches $S_R$, $S_N$, $S_{1-2}$, $S_{2-3}$, $S_{3-4}$, $S_{4-5}$, $N_1$, $N_2$, and $N_3$ is arcuately shaped to stabilize the engaged condition of the roller 102.

A torsion spring 104 is provided between the base end of the arm 101 and the case half 23a. The arm 101 or the drum stopper arm 100 is biased toward the axis of the shift drum center 99 by an elastic force of the torsion spring 104 so as to engage the roller 102 with one of the notches $S_R$, $S_N$, $S_{1-2}$, $S_{2-3}$, $S_{3-4}$, $S_{4-5}$, $N_1$, $N_2$, and $N_3$.

The shift drum center 99 is intermittently rotated by a predetermined angle (e.g., 60° in this preferred embodiment) by a feed mechanism 105. The feed mechanism 105 includes a drum shifter 106 having the same axis of rotation as that of the shift drum center 99, at least a part of the drum shifter 106 being located inside the shift drum center 99, a pair of pawls 107, 107 symmetrically mounted on the drum shifter 106 so as to be raised or lowered in the radial direction of the drum shifter 106, a pair of springs 108, 108 for respectively biasing the pair of pawls 107 in their raised directions, a plurality of engaging recesses 109 formed on the inner circumference of the shift drum center 99 and equally spaced in the circumferential direction of the shift drum center 99 so as to be engageable with the pawls 107, a fixed guide plate 110 for guiding the raised or lowered condition of the pawls 107 according to the rotation of the drum shifter 106, and a shifting motor 120 for producing a rotational force for the drum shifter 106.

The bolt 111 for coaxially connecting the shift drum center 99 to one end of the shift drum 95 is formed with a coaxial shaft portion 111a, and the drum shifter 106 is supported to the shaft portion 111a so as to be rotatable about the same axis as that of the shift drum center 99. A part of the drum shifter 106 projects outward from the shift drum center 99, and most of the drum shifter 106 is relatively rotatably located inside the shift drum center 99.

A pair of storing recesses 112, 112 for respectively storing the springs 108 are formed at the outer circumferential portion of the drum shifter 106, and a pair of cylindrical lifters 113, 113 each having a closed end are respectively slidably fitted in the storing recesses 112 in such a manner that the closed ends of the cylindrical lifters 113 respectively abut against the front end portions of the pawls 107. The springs 108 are respectively interposed under compression between the bottoms of the storing recesses 112 and the closed ends of the cylindrical lifters 113. Thus, the pawls 107 are respectively biased in their raised directions by the springs 108. In the raised condition of the pawls 107, the front end portions thereof project outward from the outer circumference of the drum shifter 106, whereas in the lowered condition of the pawls 107, the front end portions thereof are retracted to become substantially flush with the outer circumference of the drum shifter 106.

The plurality of (e.g., six in this preferred embodiment) engaging recesses 109, 109 are formed on the inner circumference of the shift drum center 99 so as to be equally spaced in the circumferential direction of the shift drum center 99. In the condition where the drum stopper arm 100 is engaged with one of the reverse positioning notch $S_R$, the neutral positioning notch $S_N$, the first and second speed positioning notch $S_{1-2}$, the second and third speed positioning notch $S_{2-3}$, the third and fourth speed positioning notch $S_{3-4}$, and the fourth and fifth speed positioning notch $S_{4-5}$, the front end portions of the pawls 107 can be selectively engaged with two of the engaging recesses 109, 109, wherein these two selected engaging recesses 109, 109 are spaced from each other.

The guide plate 110 is fastened to the case half 23a of the crankcase 23 by a pair of bolts 116, 116 so that the shift drum center 99 is interposed between the guide plate 110 and the case half 23a. The guide plate 110 is formed with a guide hole 117 corresponding to the drum shifter 106.

The guide hole 117 is composed of a large-diameter arcuate portion 117a formed about the axis of the shift drum center 99 and the drum shifter 106, or the axis of the shaft portion 111a so as to have a diameter larger than that of the outer circumference of the drum shifter 106, a restricting projection 117b projecting radially inward from the center of the large-diameter arcuate portion 117a to a position inward of the outer circumference of the drum shifter 106, a small-diameter arcuate portion 117c formed about the axis of the shaft portion 111a so as to have a diameter smaller than that of the outer circumference of the drum shifter 106, and a pair of connecting portions 117d, 117d for connecting the opposite ends of the large-diameter arcuate portion 117a to the corresponding opposite ends of the small-diameter arcuate portion 117c. The circumferential length of the large-diameter arcuate portion 117a is set to a circumferential length between the two engaging recesses 109 respectively engaging with the front end portions of the pawls 107.

Each connecting portion 117d has a central step portion 117e adapted to come into abutment against the corresponding pawl 107 when the pawl 107 engaged with the corresponding engaging recess 109 is moved toward the small-diameter arcuate portion 117c according to the rotation of the drum shifter 106, thereby depressing the pawl 107 to its lowered condition. Each step portion 117e is formed radially outside of the inner circumference of the shift drum center 99.

The restricting projection 117b functions to abut against the front end portion of one of the pawls 107 to thereby restrict the rotation of the drum shifter 106 according to a temporary stop of the rotation of the drum shifter 106 associated with a temporary stop of the operation of the shifting motor 120.

Referring to FIG. 10, a cover 119 is fastened to the first crankcase cover 31, thereby defining a speed reducing mechanism storing chamber 118 between the first crankcase cover 31 and the cover 119. The shifting motor 120 is mounted on the cover 119. The shifting motor 120 has an axis of rotation parallel to the axis of the shift drum 95. An output shaft 120a of the shifting motor 120 projects into the speed reducing mechanism storing chamber 118. A change shaft 121 having an axis parallel to the axis of the shift drum 95 rotatably extends through the first crankcase cover 31, the cover 119, and the second crankcase cover 32. A gear speed reducing mechanism 122 is stored in the speed reducing mechanism storing chamber 118 so as to be provided between the output shaft 120a and the change shaft 121.

The gear speed reducing mechanism 122 is composed of a drive gear 123 formed integrally with the output shaft 120a of the shifting motor 120, a first intermediate gear 124 meshing with the drive gear 123, a second intermediate gear 125 rotating integrally with the first intermediate gear 124, and a driven sector gear 126 fixed to one end portion of the change shaft 121 in the speed reducing mechanism storing chamber 118 and meshing with the second intermediate gear 125. Accordingly, the rotational drive force of the shifting motor 120 is reduced in speed by the gear speed reducing mechanism 122 and transmitted to the change shaft 121.

A change arm 127 is fixed at its base end portion and extends toward the drum shifter 106 in the radial direction of the change shaft 121. The change arm 127 is formed with an engaging hole 128 elongated in the longitudinal direction of the change arm 127. A pin 129 is implanted in the drum shifter 106 at a position radially offset from the axis of the drum shifter 106, and this pin 129 is movably engaged with the engaging hole 128 of the change arm 127.

Further, an arm 130 extends from the base end portion of the change arm 127 in the radial direction of the change shaft 121 so as to form a substantially L-shaped configuration in combination with the change arm 127. Thus, the arm 130 and the change arm 127 are formed integrally with each other. The arm 130 is formed at its front end portion with an arcuate hole 131 about the axis of change shaft 121 and a projection 132 projecting inward from the inner circumference of the arcuate hole 131 at a position lying on a straight line connecting the center of the arcuate portion of the arcuate hole 131 and the axis of the change shaft 121.

A pin 133 is implanted in the case half 23a of the crankcase 23 and inserted through the hole 131. A pinch spring 134 having a pair of pinch arms 134a, 134a at its opposite ends for pinching the projection 132 and the pin 133 is provided between the unit of the change arm 127 and the arm 130 and the case half 23a of the crankcase 23 so as to surround the change shaft 121. The pinch spring 134 functions to bias the unit of the change arm 127 and the arm 130 to its neutral position where the projection 132 and the pin 133 are arranged in the straight line connecting the center of the arcuate portion of the hole 131 and the axis of the change shaft 121.

In the case of upshifting from the first speed position to the second speed position in the condition where the drum stopper arm 100 is engaged with the first and second speed positioning notch $S_{1-2}$ of the shift drum center 99, the first hydraulic clutch 52 is engaged, and the second hydraulic clutch 53 is disengaged, the operation is performed in the following manner. The change shaft 121 and the change arm 127 are rotated clockwise as viewed in FIG. 12 according to the operation of the shifting motor 120, so that the drum shifter 106 of the feed mechanism 105 is rotated clockwise as viewed in FIG. 12 with the pin 129 engaged with the engaging hole 128 of the change arm 127 being displaced inside the engaging hole 128 toward the change shaft 121.

Accordingly, one of the two pawls 107, 107 respectively engaged with the engaging recesses 109, 109 is rotated about the axis of the shaft portion 111a in a region corresponding to the large-diameter arcuate portion 117a of the guide hole 117 of the guide plate 110, thereby pushing the shift drum center 99 in the clockwise direction as viewed in FIG. 12.

Figure 14:
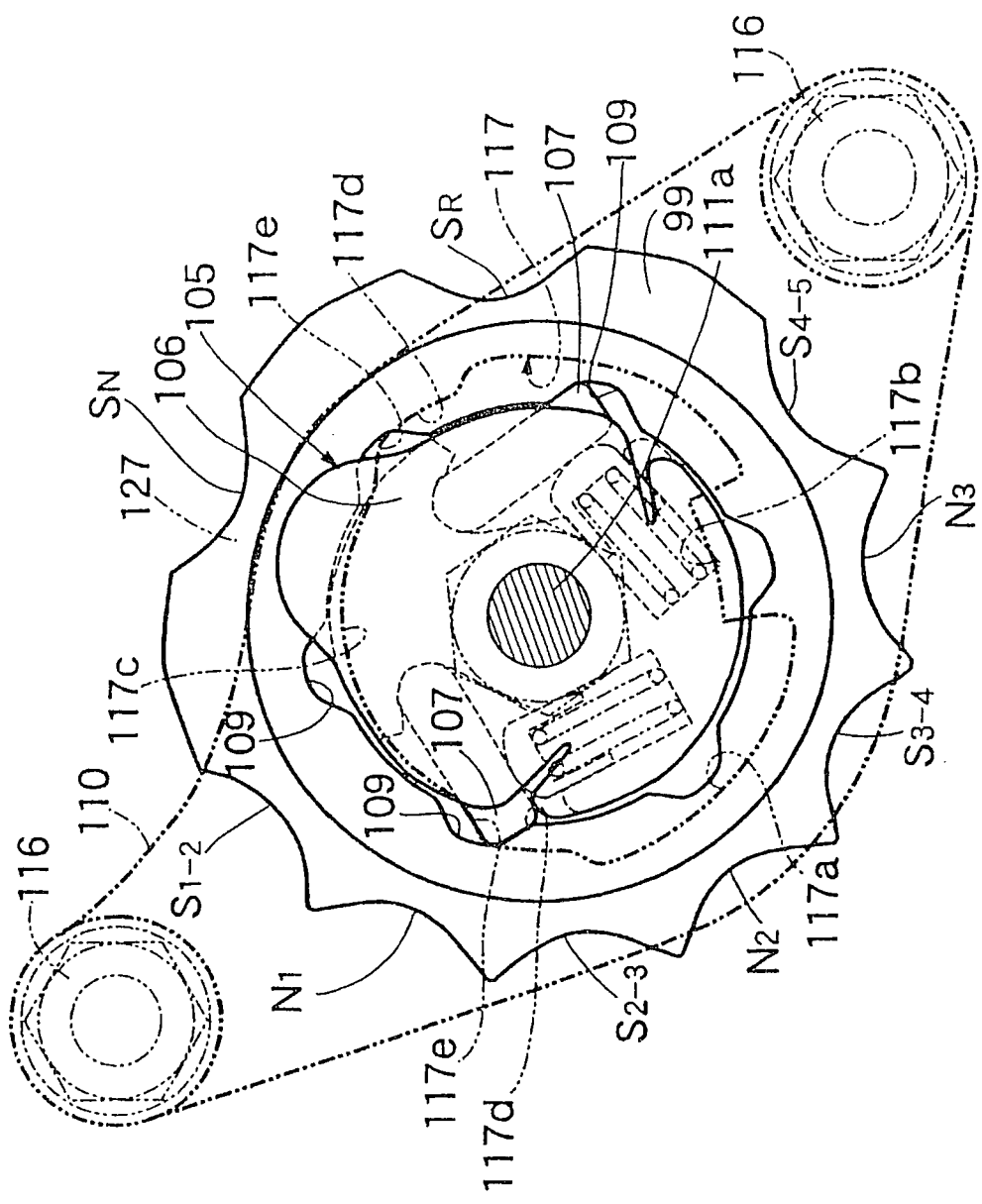
FIG. 14 is a view showing a condition of a part of a feed mechanism during the rotation of a shift drum center.

Accordingly, the shift drum 95 is rotationally driven and there is a case that the shift drum 95 may be precedingly rotated. However, in the unestablished condition of the gear trains G1 to G5 and GR as shown in FIG. 14, the other pawl of the pawls 107, 107 (not pushing the shift drum center 99) comes into abutment against the step portion 117e formed at the center of the corresponding connecting portion 117d of the guide hole 117, so that the other pawl 107 is engaged with the corresponding engaging recess 109, thereby stopping the preceding rotation of the shift drum 95.

Figure 15:
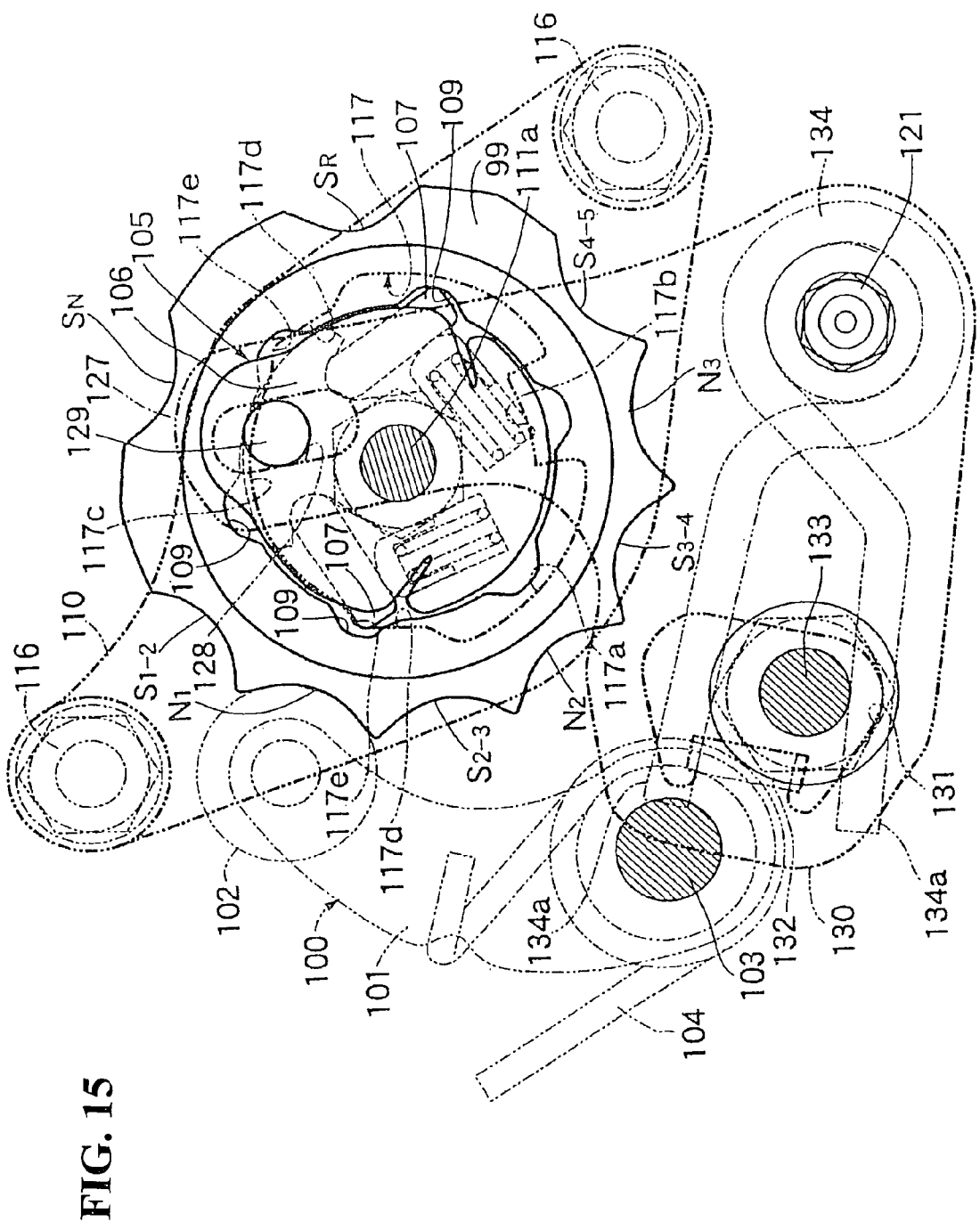
FIG. 15 is a view similar to FIG. 12 during the upshift from a first speed position to a second speed position.

In this condition, as shown in FIG. 15, the roller 102 of the drum stopper arm 100 passes over the crest between the first and second speed positioning notch $S_{1-2}$ and the neutral notch $N_1$ to come into engagement with the neutral notch $N_1$, thereby accurately obtaining the neutral position of the shift drum 95. When the drum shifter 106 is further rotated, the other pawl 107 is moved radially inward by the step portion 117e, and the roller 102 of the drum stopper arm 100 passes over the crest between the neutral notch $N_1$ and the second and third speed positioning notch $S_{2-3}$.

Figure 16:
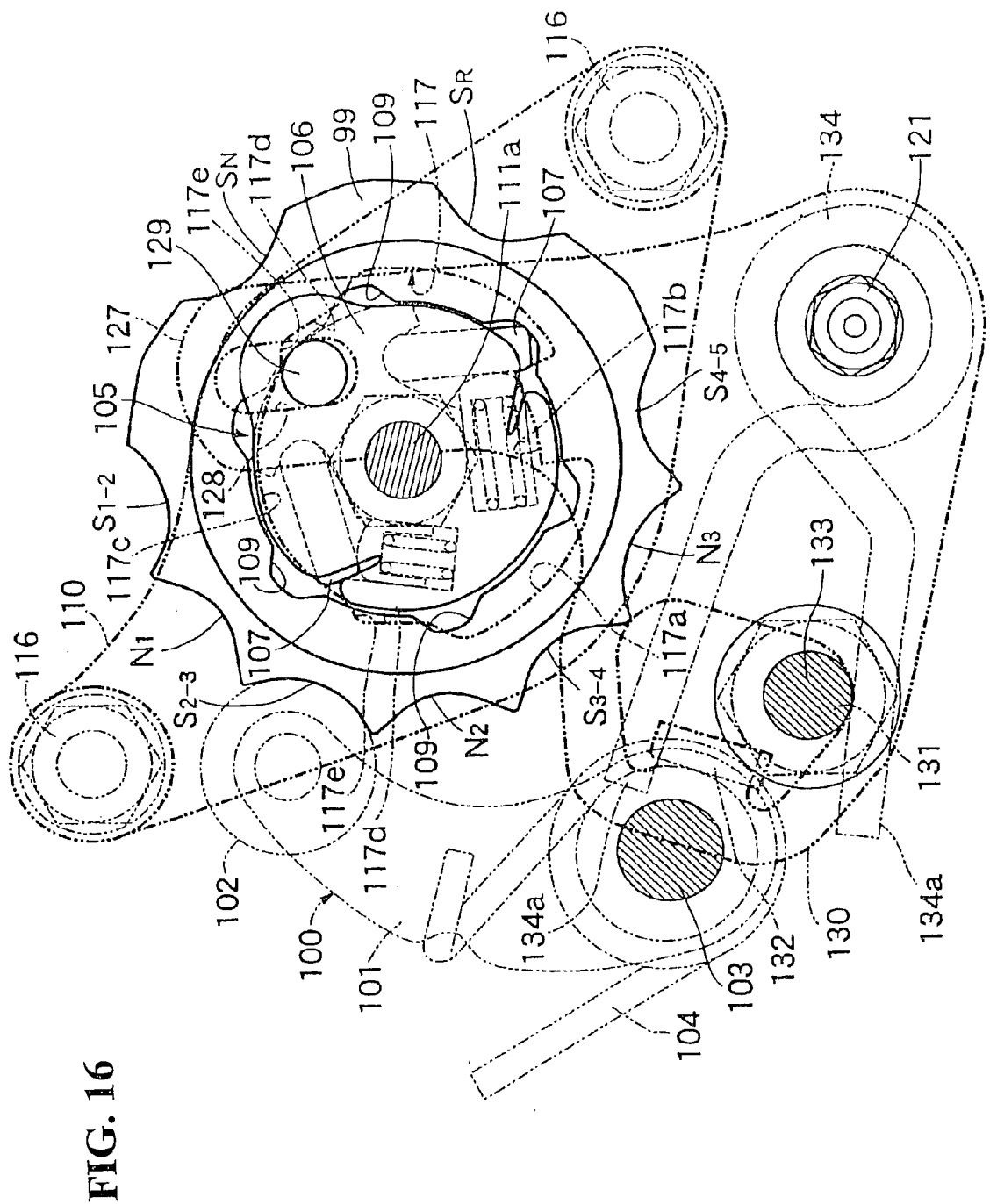
FIG. 16 is a view similar to FIG. 12 in a second speed running condition.

When the drum shifter 106 is further rotated, the other pawl 107 comes into sliding contact with the small-diameter arcuate portion 117c of the guide hole 117 of the guide plate 110, and when the roller 102 of the drum stopper arm 100 passes over the crest between the neutral notch $N_1$ and the second and third speed positioning notch $S_{2-3}$, the operation of the shifting motor 120 is stopped. Accordingly, the shift drum center 99 is rotated until the roller 102 of the drum stopper arm 100 comes into engagement with the second and third speed positioning notch $S_{2-3}$ as shown in FIG. 16. In other words, it is sufficient that the shifting motor 120 exerts a driving force for rotating the drum shifter 106 by an angle (e.g., 53.7°) less than 60° set as an angular space between the first and second speed positioning notch $S_{1-2}$ and the second and third speed positioning notch $S_{2-3}$.

Thus, the feed mechanism 105 functions to once gently reduce the rotational speed of the shift drum 95 during upshifting from the first speed position to the second speed position. Such an operation of the feed mechanism 105 is also performed similarly during upshifting from the second speed position to the third speed position, during upshifting from the third speed position to the fourth speed position, during upshifting from the fourth speed position to the fifth speed position, during downshifting from the fifth speed position to the fourth speed position, during downshifting from the fourth speed position to the third speed position, during downshifting from the third speed position to the second speed position, and during downshifting from the second speed position to the first speed position.

After the roller 102 of the drum stopper arm 100 is engaged with one of the reverse positioning notch $S_R$, the neutral positioning notch $S_N$, the first and second speed positioning notch $S_{1-2}$, the second and third speed positioning notch $S_{2-3}$, the third and fourth speed positioning notch $S_{3-4}$, and the fourth and fifth speed positioning notch $S_{4-5}$ to stop the rotation of the shift drum 95, the change arm 127 is returned to the position shown in FIGS. 12 and 13 by the elastic force of the pinch spring 134, and the drum shifter 106 is accordingly returned to the position shown in FIGS. 12 and 13.

The rotational angle of the shift drum 95 is detected by a drum rotational angle detector 135. The drum rotational angle detector 135 is connected to the other end of the shift drum 95 and mounted on the second crankcase cover 32. The rotational angle of the change shaft 121 is detected by a change shaft rotational angle detector 136. The change shaft rotational angle detector 136 is connected to the other end of the change shaft 121 and mounted on the second crankcase cover 32.

Figure 17:
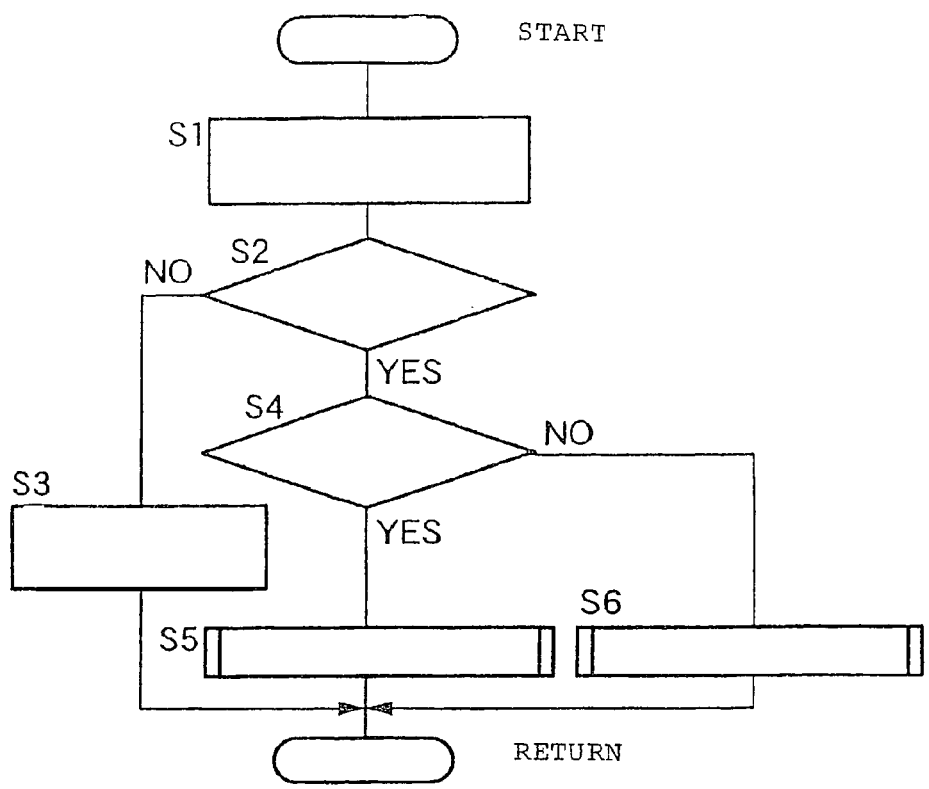
FIG. 17 is a flowchart showing an operational control procedure for a shifting motor.

The operation of the shifting motor 120 is controlled in accordance with the procedure shown in FIG. 17. In step S1, it is determined whether or not the operation of the shifting motor 120 is to be started, and the rotational angle of the change shaft 121 is initialized to "0". In step S2, it is determined whether or not a power supply voltage, i.e., an output voltage of a battery is in a normal condition exceeding a predetermined value. If the power supply voltage is lacking, the program proceeds to step S3 to stop the operation of the shifting motor 120. If the power supply voltage is normal, the program proceeds from step S2 to step S4 to determine whether or not upshifting is to be performed. If upshifting is performed, the program proceeds to step S5 to execute the processing for an upshift mode, whereas if upshifting is not performed, the program proceeds to step S6 to execute the processing for a downshift mode.

Figure 19:
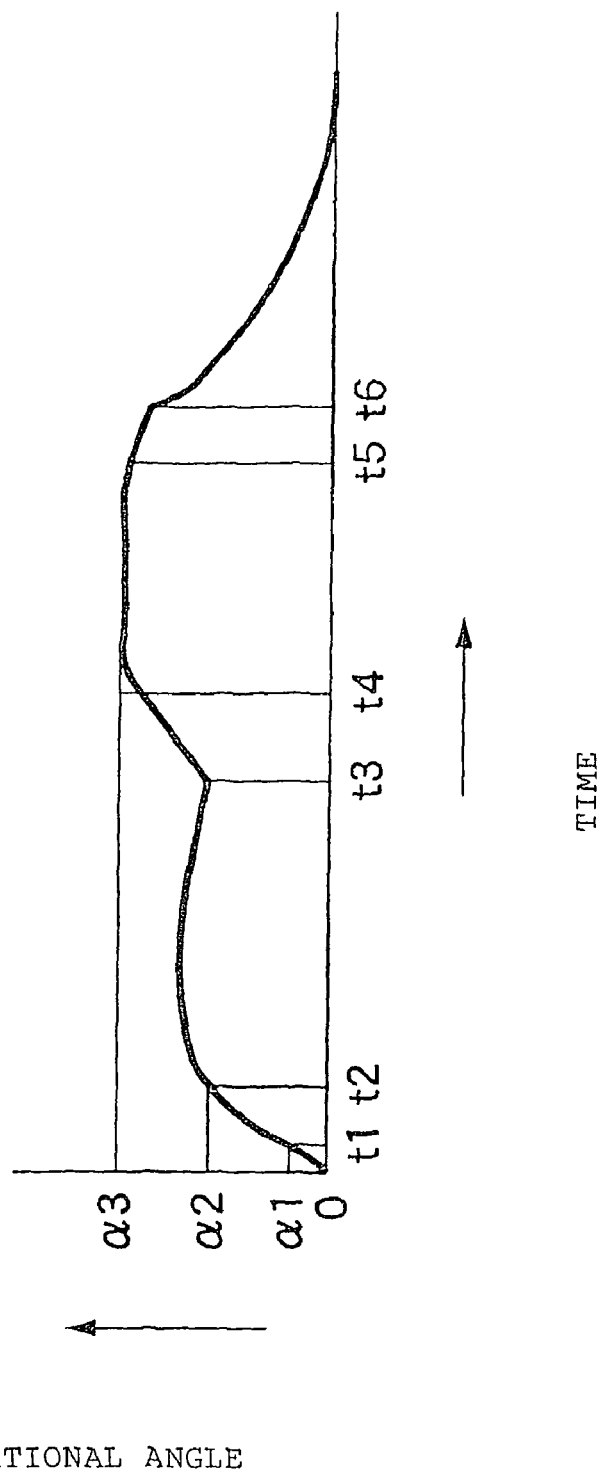
FIG. 19 is a graph showing a change in rotational angle of a change shaft during upshifting.

In the upshift mode, the processing shown in FIG. 18 is executed, and the rotational angle of the change shaft 121 is changed as shown in FIG. 19 by this processing for the upshift mode. In step S11, the shifting motor 120 is operated to rotate the change shaft 121 so that the rotational angle of the change shaft 121 detected by the change shaft rotational angle detector 136 becomes a rotational angle oil. The purpose of step S11 is to check the rotational direction of the change shaft 121 and the required time for the rotation. When the rotational angle of the change shaft 121 has reached the rotational angle α1 at the time t1, the program proceeds to step S12. In step S12, the shifting motor 120 is operated to rotate the change shaft 121 so that the rotational angle of the change shaft 121 detected by the detector 136 becomes a rotational angle α2. The rotational angle α2 is set to about half of the rotational angle (e.g., 60° in this preferred embodiment) required for rotation of the shift drum 95 to each of the reverse position $P_R$, the neutral position $P_N$, the first and second speed position $P_{1-2}$, the second and third speed position $P_{2-3}$, the third and fourth speed position $P_{3-4}$, and the fourth and fifth speed position $P_{4-5}$. In this preferred embodiment, this rotational angle α2 is set to about 30°. Accordingly, the gear train already established is changed to an unestablished condition, or a neutral condition by the operation of the corresponding shifter effected by the rotation of the change shaft 121 up to the rotational angle α2.

When the rotational angle of the change shaft 121 has reached the rotational angle α2 at the time t2, the program proceeds to step S13. In step S13, the operation of the shifting motor 120 is once stopped, and this inoperative condition is maintained for a predetermined time period ΔT until the time t3.

In step S14, the operation of the shifting motor 120 is restarted at the time t3 to rotate the change shaft 121 up to a rotational angle α3 in the same direction as that for obtaining the above rotational angles α1 and α2. The rotational angle α3 is set to a rotational angle, 60° in this preferred embodiment, required for rotation of the shift drum 95 to each of the reverse position $P_R$, the neutral position $P_N$, the first and second speed position $P_{1-2}$, the second and third speed position $P_{2-3}$, the third and fourth speed position $P_{3-4}$, and the fourth and fifth speed position $P_{4-5}$. Accordingly, a desired gear train is established by the rotation of the change shaft 121 up to the rotational angle α3. At this time, the front end portion of one of the two pawls 107 abuts against the restricting projection 117b, so that the rotation of the drum shifter 106 is restricted.

When the rotational angle of the change shaft 121 has reached the rotational angle α3 at the time t4, the program proceeds to step S15. In step S15, it is determined whether or not the shift drum 95 is in a predetermined rotational position by using the drum rotational angle detector 135. At the time t5, the program proceeds to step S16, in which the change shaft 121 is slowly rotated in the reverse direction. The purpose of step S16 is to prevent the cancellation of the selective engagement of the drum stopper arm 100 with one of the notches $S_{2-3}$, $S_{3-4}$, and $S_{4-5}$ of the shift drum center 99. At the time t6, the program proceeds to step S17, in which the change shaft 121 is rotated at a normal speed in the reverse direction to restore the initial rotational angle of 0°.

In the case of upshifting from the second speed position to the third speed position in the condition where the drum stopper arm 100 is engaged with the first and second speed positioning notch $S_{1-2}$ of the shift drum center 99, the second hydraulic clutch 53 is engaged, and the first hydraulic clutch 52 is disengaged, the drum stopper arm 100 is brought into engagement with the second and third speed positioning notch $S_{2-3}$ of the shift drum center 99 by preliminary shifting in the following manner. The change shaft 121 and the change arm 127 are rotated clockwise as viewed in FIG. 12 according to the operation of the shifting motor 120, so that the drum shifter 106 of the feed mechanism 105 is rotated clockwise as viewed in FIG. 12 with the pin 129 engaged with the engaging hole 128 being displaced inside the engaging hole 128 toward the change shaft 121.

Accordingly, one of the two pawls 107, 107 respectively engaged with the engaging recesses 109 is rotated about the axis of the shaft portion 111a in a region corresponding to the large-diameter arcuate portion 117a of the guide hole 117 of the guide plate 110, thereby pushing the shift drum center 99 in the clockwise direction as viewed in FIG. 12. When the shift drum center 99, or the shift drum 95 is rotated about 30°, the roller 102 of the drum stopper arm 100 passes over the crest between the first and second speed positioning notch $S_{1-2}$ and the neutral notch N, to come into engagement with the neutral notch N, as shown in FIG. 15. At this time, the operation of the shifting motor 120 is once stopped and this inoperative condition is maintained for the predetermined time period ΔT.

After the elapse of the predetermined time period ΔT, the operation of the shifting motor 120 is restarted to rotate the drum shifter 106 until the roller 102 of the drum stopper arm 100 comes into engagement with the second and third speed positioning notch $S_{2-3}$. In this condition, the first hydraulic clutch 52 is engaged to thereby complete the upshifting to the third speed position. When the operation of the shifting motor 120 is stopped, the change arm 127 is returned to the position shown in FIGS. 12 and 13 by the elastic force of the pinch spring 134, and the drum shifter 106 is accordingly returned to the position shown in FIGS. 12 and 13.

Thus, in rotating the shift drum center 99 from the condition where the drum stopper arm 100 is engaged with the first and second speed positioning notch $S_{1-2}$ to the condition where the drum stopper arm 100 is engaged with the second and third speed positioning notch $S_{2-3}$, the feed mechanism 105 having the shifting motor 120 functions to once stop the rotation of the shift drum center 99 to thereby temporarily maintain the condition where the drum stopper arm 100 is engaged with the neutral notch $N_1$, thereby temporarily maintaining the neutral condition of the first shifter 72.

In this manner, the feed mechanism 105 functions to once stop the rotation of the shift drum 95 in engaging the drum stopper arm 100 with the second and third speed positioning notch $S_{2-3}$ of the shift drum center 99 by the preliminary shifting as the upshifting from the first speed position to the third speed position during running at the second speed position. Such an operation of the feed mechanism 105 is also performed similarly in the preliminary shifting as the upshifting from the third speed position to the fifth speed position or the upshifting from the second speed position to the fourth speed position.

In the case of the preliminary shifting as the downshifting from the fourth speed position to the second speed position, the downshifting from the fifth speed position to the third speed position, or the downshifting from the third speed position to the first speed position, the downshift mode of step S6 shown in FIG. 17 is executed, wherein the processing is performed similarly as in the upshift mode with the rotational direction of the shifting motor 120 reversed.

The operation of the first preferred embodiment will now be described. In sliding the first shifter 72 rotating with the first main shaft 44 so as to disengage the first shifter 72 from one of the first speed drive idle gear 57 and the third speed drive idle gear 59 and to engage the first shifter 72 to the other idle gear 57 or 59, the first shift fork 91 is guided by the neutral portion 96f formed at the center of the connecting portion 96c of the first lead groove 96 formed on the outer circumference of the shift drum 95 and extending in the circumferential direction of the shift drum 95. Accordingly, as compared with the case that the connecting portion 96c is straight, the timing of engagement of the first shifter 72 to the other idle gear 57 or 59 can be retarded with respect to the rotation of the shift drum 95. Similarly, in sliding the third shifter 74 rotating with the counter shaft 46 so as to disengage the third shifter 74 from one of the second speed driven idle gear 64 and the fourth speed driven idle gear 66 and to engage the third shifter 74 to the other idle gear 64 or 66, the third shift fork 93 is guided by the neutral portion 98e formed at the center of the connecting portion 98c of the third lead groove 98 formed on the outer circumference of the shift drum 95 and extending in the circumferential direction of the shift drum 95. Accordingly, as compared with the case that the connecting portion 98c is straight, the timing of engagement of the third shifter 74 to the other idle gear 64 or 66 can be retarded with respect to the rotation of the shift drum 95.

Further, in sliding one of the first to third shifters 72 to 74 to change the established condition of one of the gear trains G1 to G5 and GR, the feed mechanism 105 functions to reduce the rotational speed of the shift drum center 99 or to once stop the rotation of the shift drum center 99 in the neutral condition of one of the shifters 72 to 74 during the sliding operation of one of the shifters 72 to 74 associated with the rotation of the shift drum center 99 by a predetermined angle. Further, during the establishment of one of the gear trains, the rotation of the shift drum 95, or the sliding operation of one of the first to third shifters 72 to 74 is once stopped to obtain the neutral condition of one of the first to third shifters 72 to 74. Further, the plural positioning notches $S_{1-2}$, $S_{2-3}$, $S_{3-4}$, and $S_{4-5}$ for selectively engaging the drum stopper arm 100 to establish any selected one of the gear trains G1 to G5 are formed on the outer circumference of the shift drum center 99 so as to be spaced at equal intervals in the circumferential direction. Further, the plural neutral notches $N_1$, $N_2$, and $N_3$ are also formed on the outer circumference of the shift drum center 99 so as to be engageable with the drum stopper arm 100 in such a manner that the neutral notch $N_1$ is formed between the notches $S_{1-2}$ and $S_{2-3}$, the neutral notch $N_2$ is formed between the notches $S_{2-3}$ and $S_{3-4}$, and the neutral notch $N_3$ is formed between the notches $S_{3-4}$ and $S_{4-5}$. Accordingly, during the establishment of one of the gear trains, a rotational resistance acting from the drum stopper arm 100 to the drum shifter 106 is once increased, so that the rotational speed of the shift drum 95, or the sliding speed of one of the first to third shifters 72 to 74 is once reduced.

Accordingly, a difference in speed between the first shifter 72 and the idle gear 57 or 59 can be relatively reduced in combination with the operation of the neutral portion 96f formed at the center of the connecting portion 96c of the lead groove 96, thereby more effectively preventing an increase in engagement noise. Similarly, a difference in speed between the third shifter 74 and the idle gear 64 or 66 can be relatively reduced in combination with the operation of the neutral portion 98e formed at the center of the connecting portion 98c of the lead groove 98, thereby more effectively preventing an increase in engagement noise.

In sliding the first shifter 72 rotating with the first main shaft 44 so as to disengage the first shifter 72 from one of the first speed drive idle gear 57 and the third speed drive idle gear 59 and to engage the first shifter 72 to the other idle gear 57 or 59 in the condition where the transmission of power from the engine E to the first main shaft 44 is cut off and the power from the engine E is transmitted to the second main shaft 45, the first shift fork 91 is guided by the neutral portion 96f formed at the center of the connecting portion 96c of the first lead groove 96 formed on the outer circumference of the shift drum 95 and extending in the circumferential direction of the shift drum 95. Accordingly, the timing of engagement of the first shifter 72 to the other idle gear 57 or 59 can be retarded with respect to the rotation of the shift drum 95. Further, the feed operation at the predetermined angle by the feed mechanism 105 is once stopped, the rotation of the shift drum 95 is once stopped by engaging the pawl 107 to the engaging recess 109 owing to the guide plate 110, and the rotation of the shift drum center 99 is once stopped by engaging the drum stopper arm 100 to the neutral notch $N_1$. In the condition where the idle gears 57 and 59 are rotated by the establishment of the second speed gear train G2 provided between the second main shaft 45 and the counter shaft 46, the rotation of the first main shaft 44 is induced by the viscosity of a lubricating oil filled between the needle bearings 48 provided between the first and second main shafts 44 and 45 or the viscosity of a lubricating oil between the first hydraulic clutch 52 and the cylindrical transmitting shaft 49. Accordingly, a difference in rotational speed between the first shifter 72 and the idle gear 57 or 59 can be relatively reduced to thereby prevent an increase in engagement noise.

In sliding the third shifter 74 rotating with the counter shaft 46 so as to disengage the third shifter 74 from one of the second speed driven idle gear 64 and the fourth speed driven idle gear 66 and to engage the third shifter 74 to the other idle gear 64 or 66 in the condition where the transmission of power from the engine E to the second main shaft 45 is cut off and the power from the engine E is transmitted to the first main shaft 44, the third shift fork 93 is guided by the neutral portion 98e formed at the center of the connecting portion 98c of the third lead groove 98 formed on the outer circumference of the shift drum 95 and extending in the circumferential direction of the shift drum 95. Accordingly, the timing of engagement of the third shifter 74 to the other idle gear 64 or 66 can be retarded with respect to the rotation of the shift drum 95. Further, the feed operation at the predetermined angle by the feed mechanism 105 is once stopped, the rotational resistance by the guide plate 110 is applied to the drum shifter 106, and the rotation of the shift drum center 99 is once stopped by engaging the drum stopper arm 100 to the neutral notch $N_2$. In the condition where the counter shaft 46 and the third shifter 74 are rotated by the establishment of the third speed gear train G3 provided between the first main shaft 44 and the counter shaft 46, the rotation of the second main shaft 45 is induced by the viscosity of the lubricating oil between the needle bearings 48 or the viscosity of the lubricating oil between the second hydraulic clutch 53 and the cylindrical transmitting shaft 49. Accordingly, a difference in rotational speed between the idle gear 64 or 66 and the third shifter 74 can be relatively reduced to thereby more effectively prevent an increase in engagement noise.

Figure 20:
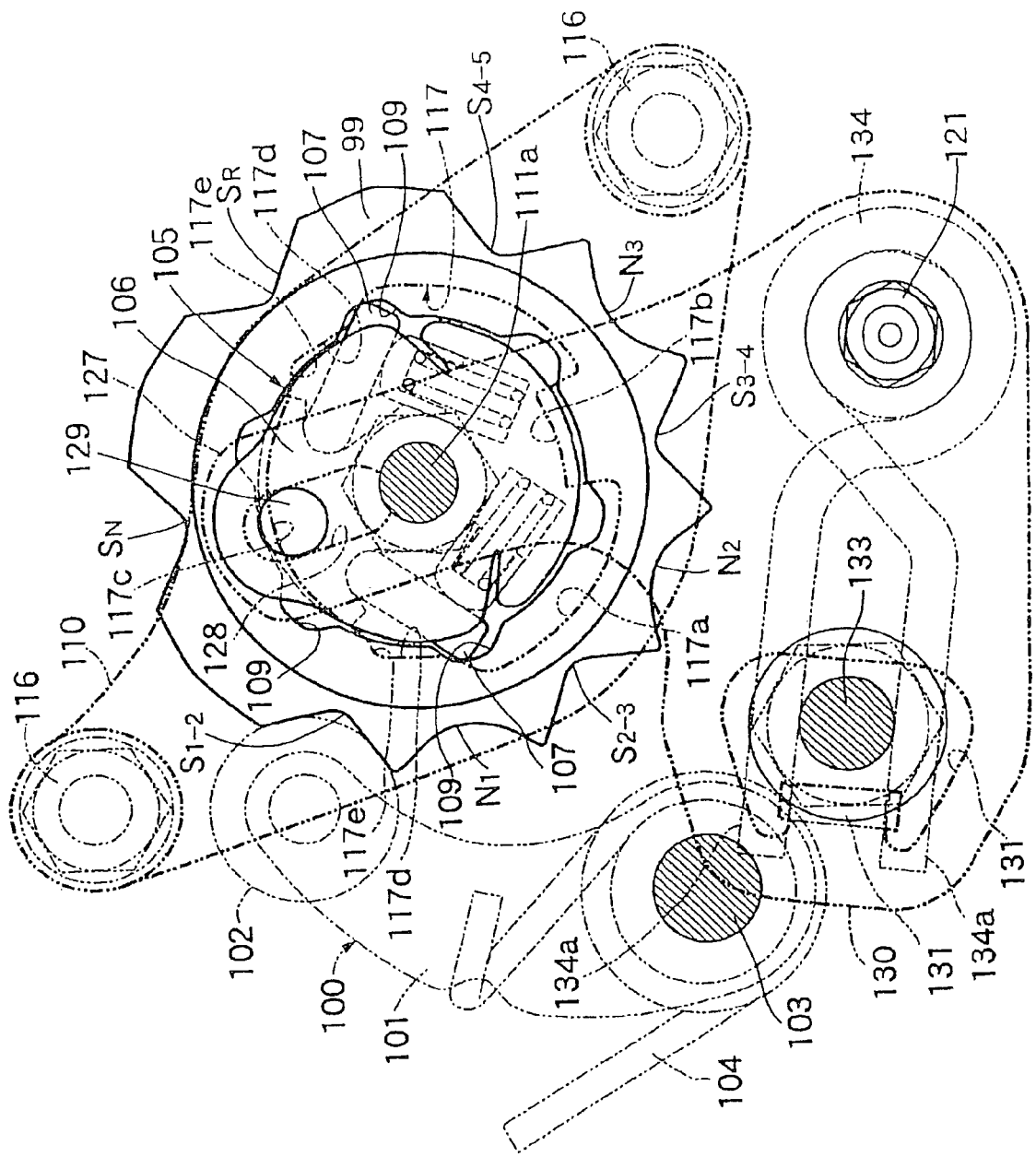
FIG. 20 is a view similar to FIG. 12, showing a second preferred embodiment of the present invention.

FIG. 20 shows a second preferred embodiment of the present invention. In the second preferred embodiment, the reverse positioning notch $S_R$, the neutral positioning notch $S_N$, the first and second speed positioning notch $S_{1-2}$, the second and third speed positioning notch $S_{2-3}$, the third and fourth speed positioning notch $S_{3-4}$, and the fourth and fifth speed positioning notch $S_{4-5}$ are V-shaped, and the neutral notches $N_1$, $N_2$, and $N_3$ are arcuately shaped.

According to the second preferred embodiment, the drum stopper arm 100 can be quickly engaged to and disengaged from the positioning notches $S_R$, $S_N$, $S_{1-2}$, $S_{2-3}$, $S_{3-4}$, and $S_{4-5}$, and the disengagement of the drum stopper arm 100 from the neutral notches $N_1$, $N_2$, and $N_3$ can be made hard. Accordingly, the engaged condition of the drum stopper arm 100 in the neutral notches $N_1$, $N_2$, and $N_3$ can be maintained relatively long, so that the neutral condition can be maintained relatively long.

While the specific preferred embodiments of the present invention have been described above, it should be noted that the present invention is not limited to the above preferred embodiments, but various modifications may be made without departing from the scope of the present invention as defined in the appended claims.

In the above preferred embodiments, the feed mechanism 105 is configured to once stop the rotation of the shift drum center 99 in the neutral condition of the shifters 72 to 74 during the sliding operation of the shifters 72 to 74 by rotating the shift drum center 99 by a predetermined angle to change the established condition of the plural gear trains G1 to G5. As a modification, the feed mechanism 105 may be configured to reduce the rotational speed of the shift drum center 99 in the neutral condition of the shifters 72 to 74. For example, the shifting motor 120 may be reduced in operational speed or reversed in operational direction at the time the shift forks 91 and 93 pass the neutral portions 96f and 98e of the lead grooves 96 and 98, respectively. Alternatively, the shifting motor 120 may be controlled so that the change shaft 121 is not rotated at the time the shift forks 91 and 93 pass the neutral portions 96f and 98e, respectively.

What is claimed is:

1. A transmission for a vehicle comprising:
a main shaft to which power from an engine is adapted to be transmitted;
a counter shaft connected to a drive wheel;
a plurality of gear trains (G1 to G5) respectively corresponding to a plurality of shift positions and provided between said main shaft and said counter shaft (46) so as to be selectively established;
a shifter relatively nonrotatably and slidably supported to said main shaft or said counter shaft to change the established condition of said gear trains (G1 to G5); and
a feed mechanism for sliding said shifter in the axial direction of said main shaft or said counter shaft;
wherein in sliding said shifter to change the established condition of said gear trains (G1 to G5), the transmission of power from said engine to said main shaft is cut off; and
said feed mechanism is configured to reduce the sliding speed of said shifter in a neutral condition, or to cause the sliding operation of said shifter in the neutral condition to have a single stopping action during the sliding operation of said shifter in changing the established condition of said gear trains (G1 to G5), and
further comprising:
a shift fork for rotatably retaining said shifter;
a shift drum having a lead groove on the outer circumference thereof for engaging said shift fork; and
a shift drum center rotating with said shift drum;
wherein said feed mechanism has a shifting motor and rotationally drives said shift drum center by a predetermined angle according to the operation of said shifting motor; and
said feed mechanism is configured to reduce the rotational speed of said shift drum center in the neutral condition, or to cause the rotation of said shift drum center in said neutral condition to have the single stopping action during the sliding operation of said shifter in changing the established condition of said gear trains (G1 to G5) wherein a pair of idle gears constituting a part of two gear trains (G1, G3; G2, G4) of said plurality of gear trains (G1 to G5) are rotatably supported to said main shaft or said counter shaft; and
said lead groove formed on the outer circumference of said shift drum so as to engage said shift fork for rotatably retaining said shifter, said lead groove including:
a first gear train establishing portion extending in the circumferential direction of said shift drum so as to bring said shifter into engagement with one of said idle gears,
a second gear train establishing portion offset from said first gear train establishing portion in the axial direction of said shift drum and extending in the circumferential direction of said shift drum so as to bring said shifter into engagement with the other of said idle gears,
a connecting portion for connecting said first gear train establishing portion and said second gear train establishing portion, and
a neutral portion for holding said shifter at a position where said shifter is disengaged from both of said idle gears,
said neutral portion being formed at the center of said connecting portion so as to extend in the circumferential direction of said shift drum.

2. The transmission for the vehicle according to claim 1, further comprising a drum stopper arm adapted to engage with the outer circumference of said shift drum center intermittently rotated by said feed mechanism, said drum stopper arm being biased toward the axis of rotation of said shift drum center to determine a rotational position of said shift drum center;
wherein the outer circumference of said shift drum center is formed with a plurality of positioning notches spaced at equal intervals in the circumferential direction for selectively engaging said drum stopper arm to establish any selected one of said gear trains (G1 to G5) and a neutral notch adapted to engage said drum stopper arm to obtain said neutral condition, said neutral notch being formed between any adjacent ones of said plurality of positioning notches.

3. The transmission for the vehicle according to claim 2, wherein each of said positioning notches is V-shaped, and said neutral notch is arcuately shaped.

4. The transmission for the vehicle according to claim 1, wherein said shift drum center is intermittently rotated by said feed mechanism;
said feed mechanism comprises:
a drum shifter having the same axis of rotation as that of said shift drum center, at least a part of said drum shifter being located inside said shift drum center,
a pair of pawls symmetrically mounted on said drum shifter so as to be raised or lowered in the radial direction of said drum shifter,
a pair of springs for respectively biasing said pair of pawls in their raised directions,
a plurality of engaging recesses formed on the inner circumference of said shift drum center and equally spaced in the circumferential direction of said shift drum center so as to be engageable with said pawls,
a fixed guide plate for guiding the raised or lowered condition of said pawls according to the rotation of said drum shifter, and said shifting motor for producing a rotational force for said drum shifter;
said guide plate including a large-diameter arcuate portion, a small-diameter arcuate portion, and a connecting portion for connecting said large-diameter arcuate portion and said small-diameter arcuate portion; and
said connecting portion is formed so as to bring one of said pawls into engagement with one of said engaging recesses during the rotation of said drum shifter by a rotational amount required for changing of the established condition of said gear trains (G1 to G5).

5. A transmission for a vehicle comprising:
first and second main shafts to which power from an engine is adapted to be transmitted, said first and second main shafts being coaxial with each other;
a counter shaft connected to a drive wheel;
a plurality of gear trains (G1 to G5) respectively corresponding to a plurality of shift positions and provided between said first main shaft and said counter shaft and between said second main shaft and said counter shaft so as to be selectively established;
a shifter relatively nonrotatably and slidably supported to said first main shaft or said counter shaft to change the established condition of said gear trains (G1, G3, G5) provided between said first main shaft and said counter shaft; and a feed mechanism for sliding said shifter in the axial direction of said first main shaft or said counter shaft;
wherein in sliding said shifter to change the established condition of said gear trains (G1, G3, G5) provided between said first main shaft and said counter shaft, the transmission of power from said engine to said first main shaft is cut off in the condition where the power from said engine is transmitted to said second main shaft; and
said feed mechanism is configured to reduce the sliding speed of said shifter in a neutral condition, or to cause the sliding operation of said shifter in the neutral condition to have a single stopping action where said gear trains (G1, G3, G5) provided between said first main shaft and said counter shaft are not established during the sliding operation of said shifter in changing the established condition of said gear trains (G1, G3, G5).

6. The transmission for the vehicle according to claim 5, further comprising:
a shift fork for rotatably retaining said shifter;
a shift drum having a lead groove on the outer circumference for engaging said shift fork; and
a shift drum center rotating with said shift drum;
wherein said feed mechanism has a shifting motor and rotationally drives said shift drum center by a predetermined angle according to the operation of said shifting motor; and
said feed mechanism is configured to reduce the rotational speed of said shift drum center or to cause the rotation of said shift drum center in said neutral condition to have the single stopping action during the sliding operation of said shifter in changing the established condition of said gear trains (G1, G3, G5) provided between said first main shaft and said counter shaft.

7. The transmission for the vehicle according to claim 6, wherein a pair of idle gears constituting a part of two gear trains (G1, G3; G2, G4) of said plurality of gear trains (G1 to G5) are rotatably supported to said main shaft or said counter shaft; and
said lead groove formed on the outer circumference of said shift drum so as to engage said shift fork for rotatably retaining said shifter, said lead groove including:
a first gear train establishing portion extending in the circumferential direction of said shift drum so as to bring said shifter into engagement with one of said idle gears,
a second gear train establishing portion offset from said first gear train establishing portion in the axial direction of said shift drum and extending in the circumferential direction of said shift drum so as to bring said shifter into engagement with the other of said idle gears,
a connecting portion for connecting said first gear train establishing portion and said second gear train establishing portion, and
a neutral portion for holding said shifter at a position where said shifter is disengaged from both of said idle gears,
said neutral portion being formed at the center of said connecting portion so as to extend in the circumferential direction of said shift drum.

8. The transmission for the vehicle according to claim 6, further comprising a drum stopper arm adapted to engage with the outer circumference of said shift drum center intermittently rotated by said feed mechanism, said drum stopper arm being biased toward the axis of rotation of said shift drum center to determine a rotational position of said shift drum center;
wherein the outer circumference of said shift drum center is formed with a plurality of positioning notches spaced at equal intervals in the circumferential direction for selectively engaging said drum stopper arm to establish any selected one of said gear trains (G1 to G5) and a neutral notch adapted to engage said drum stopper arm to obtain said neutral condition, said neutral notch being formed between any adjacent ones of said plurality of positioning notches.

9. The transmission for the vehicle according to claim 8, wherein each of said positioning notches is V-shaped, and said neutral notch is arcuately shaped.

10. The transmission for the vehicle according to claim 6, wherein said shift drum center is intermittently rotated by said feed mechanism;
said feed mechanism comprises:
a drum shifter having the same axis of rotation as that of said shift drum center, at least a part of said drum shifter being located inside said shift drum center,
a pair of pawls symmetrically mounted on said drum shifter so as to be raised or lowered in the radial direction of said drum shifter,
a pair of springs for respectively biasing said pair of pawls in their raised directions, a plurality of engaging recesses formed on the inner circumference of said shift drum center and equally spaced in the circumferential direction of said shift drum center so as to be engageable with said pawls, a fixed guide plate for guiding the raised or lowered condition of said pawls according to the rotation of said drum shifter, and said shifting motor for producing a rotational force for said drum shifter;

said guide plate including a large-diameter arcuate portion, a small-diameter arcuate portion, and a connecting portion for connecting said large-diameter arcuate portion and said small-diameter arcuate portion; and said connecting portion is formed so as to bring one of said pawls into engagement with one of said engaging recesses during the rotation of said drum shifter by a rotational amount required for changing of the established condition of said gear trains (G1 to G5).

11. A transmission for a vehicle comprising:

first and second main shafts to which power from an engine is adapted to be transmitted, said first and second main shafts being coaxial with each other;

a counter shaft connected to a drive wheel;

a plurality of gear trains (G1 to G5) respectively corresponding to a plurality of shift positions and provided between said first main shaft and said counter shaft and between said second main shaft and said counter shaft so as to be selectively established;

a shifter relatively nonrotatably and slidably supported to said counter shaft so as to change the established condition of said gear trains (G2, G4) provided between said second main shaft and said counter shaft; and a feed mechanism for sliding said shifter in the axial direction of said counter shaft;

wherein in sliding said shifter to change the established condition of said gear trains (G2, G4) provided between said second main shaft and said counter shaft, the transmission of power from said engine to said second main shaft is cut off in the condition where the power from said engine is transmitted to said first main shaft; and said feed mechanism is configured to reduce the sliding speed of said shifter or to stop the sliding operation of said shifter in a neutral condition for a single predetermined time period where said gear trains (G2, G4) provided between said second main shaft and said counter shaft are not established during the sliding operation of said shifter in changing the established condition of said gear trains (G2, G4).

12. The transmission for the vehicle according to claim 11, further comprising:

a shift fork for rotatably retaining said shifter;

a shift drum having a lead groove on the outer circumference for engaging said shift fork; and a shift drum center rotating with said shift drum;

wherein said feed mechanism has a shifting motor and rotationally drives said shift drum center by a predetermined angle according to the operation of said shifting motor; and said feed mechanism is configured to reduce the rotational speed of said shift drum center or to stop the rotation of said shift drum center in said neutral condition for the single predetermined time period during the sliding operation of said shifter in changing the established condition of said gear trains (G2, G4) provided between said second main shaft and said counter shaft.

13. The transmission for the vehicle according to claim 12, wherein a pair of idle gears constituting a part of two gear trains (G1, G3; G2, G4) of said plurality of gear trains (G1 to G5) are rotatably supported to said main shaft or said counter shaft; and said lead groove formed on the outer circumference of said shift drum so as to engage said shift fork for rotatably retaining said shifter, said lead groove including:

a first gear train establishing portion extending in the circumferential direction of said shift drum so as to bring said shifter into engagement with one of said idle gears, a second gear train establishing portion offset from said first gear train establishing portion in the axial direction of said shift drum and extending in the circumferential direction of said shift drum so as to bring said shifter into engagement with the other of said idle gears, a connecting portion for connecting said first gear train establishing portion and said second gear train establishing portion, and a neutral portion for holding said shifter at a position where said shifter is disengaged from both of said idle gears, said neutral portion being formed at the center of said connecting portion so as to extend in the circumferential direction of said shift drum.

14. The transmission for the vehicle according to claim 12, further comprising a drum stopper arm adapted to engage with the outer circumference of said shift drum center intermittently rotated by said feed mechanism, said drum stopper arm being biased toward the axis of rotation of said shift drum center to determine a rotational position of said shift drum center;

wherein the outer circumference of said shift drum center is formed with a plurality of positioning notches spaced at equal intervals in the circumferential direction for selectively engaging said drum stopper arm to establish any selected one of said gear trains (G1 to G5) and a neutral notch adapted to engage said drum stopper arm to obtain said neutral condition, said neutral notch being formed between any adjacent ones of said plurality of positioning notches.

15. The transmission for the vehicle according to claim 14, wherein each of said positioning notches is V-shaped, and said neutral notch is arcuately shaped.

16. The transmission for the vehicle according to claim 12, wherein said shift drum center is intermittently rotated by said feed mechanism;

said feed mechanism comprises:

a drum shifter having the same axis of rotation as that of said shift drum center, at least a part of said drum shifter being located inside said shift drum center, a pair of pawls symmetrically mounted on said drum shifter so as to be raised or lowered in the radial direction of said drum shifter, a pair of springs for respectively biasing said pair of pawls in their raised directions, a plurality of engaging recesses formed on the inner circumference of said shift drum center and equally spaced in the circumferential direction of said shift drum center so as to be engageable with said pawls, a fixed guide plate for guiding the raised or lowered condition of said pawls according to the rotation of said drum shifter, and said shifting motor for producing a rotational force for said drum shifter;

said guide plate including a large-diameter arcuate portion, a small-diameter arcuate portion, and a connecting portion for connecting said large-diameter arcuate portion and said small-diameter arcuate portion; and said connecting portion is formed so as to bring one of said pawls into engagement with one of said engaging recesses during the rotation of said drum shifter by a rotational amount required for changing of the established condition of said gear trains (G1 to G5).

* * * * *